(12) United States Patent
Matsuo et al.

(10) Patent No.: US 8,854,210 B2
(45) Date of Patent: Oct. 7, 2014

(54) ECO-DRIVE ASSIST APPARATUS, ECO-DRIVE ASSIST INFORMATION GENERATING APPARATUS, ECO-DRIVE ASSIST INFORMATION CALCULATION APPARATUS, ECO-DRIVE STATE DISPLAY APPARATUS, ECO-DRIVE ASSIST SYSTEM, AND ECO-DRIVE ASSIST INFORMATION CALCULATION METHOD

(75) Inventors: Tomohiro Matsuo, Kobe (JP); Masato Ishio, Kobe (JP); Kohichi Tomiyama, Kobe (JP); Masatoshi Watanabe, Kobe (JP); Kan Saito, Okazaki (JP)

(73) Assignees: Fujitsu Ten Limited, Kobe-shi (JP); Toyota Jidosha Kabushiki Kaisha, Toyota (JP)

( * ) Notice: Subject to any disclaimer, the term of this patent is extended or adjusted under 35 U.S.C. 154(b) by 783 days.

(21) Appl. No.: 12/746,645

(22) PCT Filed: Dec. 12, 2008

(86) PCT No.: PCT/JP2008/072687
§ 371 (c)(1),
(2), (4) Date: Jun. 7, 2010

(87) PCT Pub. No.: WO2009/078363
PCT Pub. Date: Jun. 25, 2009

(65) Prior Publication Data
US 2010/0259374 A1 Oct. 14, 2010

(30) Foreign Application Priority Data

Dec. 17, 2007 (JP) ................................. 2007-325314
Dec. 17, 2007 (JP) ................................. 2007-325315
Dec. 18, 2007 (JP) ................................. 2007-325878

(51) Int. Cl.
*B60Q 1/00* (2006.01)
*F02D 29/02* (2006.01)

(52) U.S. Cl.
CPC ...................................... *F02D 29/02* (2013.01)
USPC ........................... 340/541; 73/114.53; 701/99

(58) Field of Classification Search
USPC ....................... 701/99, 29, 123; 340/438, 439; 73/114.53; 123/492
See application file for complete search history.

(56) References Cited

U.S. PATENT DOCUMENTS 5,693,876 A * 12/1997 Ghitea et al. ................ 73/114.53
8,037,870 B2 * 10/2011 Saito et al. .................... 123/492

(Continued)

FOREIGN PATENT DOCUMENTS

| JP | A-57-198125 | 12/1982 |
| JP | A-11-220807 | 8/1999 |

(Continued)

OTHER PUBLICATIONS

International Search Report dated Feb. 10, 2009 in International Patent Application No. PCT/JP2008/072687.

(Continued)

*Primary Examiner* — Andrew Bee
*Assistant Examiner* — Kaleria Knox
(74) *Attorney, Agent, or Firm* — Oliff PLC

(57) ABSTRACT

An eco drive support apparatus which reports the eco degree of the driving operation of a vehicle by displaying a state relative to a judgment threshold which varies corresponding to the drive state of the vehicle. The apparatus has a power train ECU which computes the judgment threshold and an eco drive state amount expressing a ratio to the judgment threshold on the basis of the drive state of the vehicle and a meter ECU which indicates the eco drive state amount on the basis of information transmitted from the power train ECU. The power train ECU transmits the eco drive state amount to the meter ECU.

13 Claims, 28 Drawing Sheets

(56) References Cited

U.S. PATENT DOCUMENTS

| | | | |
|---|---|---|---|
| 2005/0021222 A1* | 1/2005 | Minami et al. | 701/123 |
| 2005/0200463 A1* | 9/2005 | Situ et al. | 340/438 |
| 2007/0208468 A1* | 9/2007 | Sankaran et al. | 701/29 |
| 2008/0015767 A1* | 1/2008 | Masuda et al. | 701/99 |
| 2009/0157290 A1* | 6/2009 | Ji et al. | 701/123 |

FOREIGN PATENT DOCUMENTS

| | | |
|---|---|---|
| JP | A-2001-171388 | 6/2001 |
| JP | A-2002-362185 | 12/2002 |
| JP | A-2002-370560 | 12/2002 |
| JP | A-2003-112585 | 4/2003 |
| JP | A-2003-220851 | 8/2003 |
| JP | A-2004-38388 | 2/2004 |
| JP | A-2004-270580 | 9/2004 |
| JP | A-2005-214086 | 8/2005 |
| JP | A-2006-57484 | 3/2006 |
| JP | A-2006-77665 | 3/2006 |
| JP | A-2006-233760 | 9/2006 |
| JP | A-2006-321364 | 11/2006 |
| JP | A-2007-138926 | 6/2007 |
| JP | A-2007-298017 | 11/2007 |
| JP | A-2007-304067 | 11/2007 |

OTHER PUBLICATIONS

Japanese Office Action dated Aug. 11, 2009 in Japanese Patent Application No. 2007-325314 (with translation).

Japanese Office Action dated Aug. 11, 2009 in Japanese Patent Application No. 2007-325315 (with translation).

Mar. 26, 2012 Office Action issued in Chinese Patent Application No. 200880120989.2 (with translation).

Chinese Office Action issued in Chinese Application No. 200880120989.2 dated Nov. 5, 2012 (w/translation).

Office Action issued in Chinese Patent Application No. 200880120989.2 dated Apr. 19, 2013 (with translation).

* cited by examiner

FIG. 7

| INTERNAL STATUS | ADVICE SIGNAL STATUS | STATE QUANTITY OF ECO ZONE DISPLAY | ECO LAMP LIGHTING STATUS SIGNAL |
|---|---|---|---|
| FAIL | [00000001] | PREDETERMINED VALUE (VALUE REPRESENTING FAIL) | OFF |
| EXCEPTION | [00000010] | PREDETERMINED VALUE (VALUE REPRESENTING EXCEPTION) | OFF |
| PARKED | [00000100] | PREDETERMINED VALUE (VALUE REPRESENTING PARKED) | OFF |
| NON ECO | [00001000] | 100%<[STATE QUANTITY OF ECO-DRIVE≦120% | OFF |
| ECO | [00010000] | 0%<[STATE QUANTITY OF ECO-DRIVE≦100% | ON |

FIG. 26

| INTERNAL STATUS | ADVICE SIGNAL STATUS | STATE QUANTITY OF VEHICLE POWER DISPLAY | STATE QUANTITY OF HV ECO ZONE DISPLAY | ECO LAMP LIGHTING STATUS SIGNAL |
|---|---|---|---|---|
| FAIL | [00000001] | PREDETERMINED VALUE (VALUE REPRE-SENTING FAIL) | PREDETERMINED VALUE (VALUE REPRE-SENTING FAIL) | OFF |
| EXCEPTION | [00000010] | PREDETERMINED VALUE (VALUE REPRE-SENTING EXCEPTION) | PREDETERMINED VALUE (VALUE REPRE-SENTING EXCEPTION) | OFF |
| PARKED | [00000100] | PREDETERMINED VALUE VALUE REPRE-SENTING PARKED | STATE QUANTITY OF HV ECO ZONE DISPLAY (0%~100%) | OFF |
| NON ECO | [00001000] | 100%<[STATE QUANTITY OF VEHICLE POWER DISPLAY≦120% | STATE QUANTITY OF HV ECO ZONE DISPLAY (0%~100%) | OFF |
| ECO | [00010000] | -100%<[STATE QUANTITY OF VEHICLE POWER DISPLAY≦100% | STATE QUANTITY OF HV ECO ZONE DISPLAY (0%~100%) | ON |
| HV ECO | | | | |

ECO-DRIVE ASSIST APPARATUS, ECO-DRIVE ASSIST INFORMATION GENERATING APPARATUS, ECO-DRIVE ASSIST INFORMATION CALCULATION APPARATUS, ECO-DRIVE STATE DISPLAY APPARATUS, ECO-DRIVE ASSIST SYSTEM, AND ECO-DRIVE ASSIST INFORMATION CALCULATION METHOD

TECHNICAL FIELD

The present invention relates to techniques for assisting driver's eco-drive.

BACKGROUND ART

Recently, some vehicles have been equipped with an eco-drive assist apparatus for assisting the drive in eco-drive in view of environmental protection. For example, the eco-drive assist apparatus determines whether the vehicle is traveling efficiently in fuel economy by checking various factors, which may include the degree of depressing the accelerator pedal, the efficiency of the engine and transmission, the traveling speed and the accelerated velocity. When the vehicle is traveling efficiently in fuel economy, the vehicle is in an eco-drive state. When it is determined that the vehicle is in the eco-drive state, an LED (Light Emitting Diode) may be turned ON. The fuel economy may be calculated at an instantaneous time in traveling and may be indicated as an instantaneous fuel efficiency.

Generating and displaying information for assisting eco-drive is performed by a meter ECU (Electronic Control Unit) that calculates display information displayed on an instrument panel in a vehicle. The meter ECU obtains information such as the degree of depressing the accelerator pedal, the vehicle speed, the shift position, and the switch to change the control mode of the vehicle, generates information for determining whether the vehicle is in the eco-drive state, and switches the display for eco-drive.

The art disclosed in Patent Reference 1 uses a CPU to control a vehicle engine and the like, and a microcomputer including sub-processor capable of being controlled by programs independently from the CPU, and concurrently processes a transmission control program for a certain communication method stored in a memory with a sub-program.

Patent Reference 2 discloses a system where an engine ECU, an ABS_ECU, and a meter ECU are coupled to each other on the CAN communication line, and a management table of the engine ECU manages a sharable area of a memory in other ECUs.

In Patent Reference 3, an engine control unit of a vehicle is coupled to a microcomputer including a keyboard switch and a display device by a communication interface, and a driver is able to correct a fuel injection control.

Patent References 4 through 6 disclose techniques that record detected values of driver's driving operation such as the accelerator opening, a vehicle speed, and a fuel consumption, and display a result of comparison to a standard value.

In Patent Reference 7, to encourage a driver to carry out the driving operation to improve the fuel efficiency effectively, whether driver's driving operation is suitable for improving the fuel efficiency or not is determined, and a lamp is turned ON when it is determined that the driving operation suitable for improving the fuel efficiency is carried out.

[Patent Reference 1] Japanese Patent Application Publication No. 2003-112585

[Patent Reference 2] Japanese Patent Application Publication No. 2004-38388

[Patent Reference 3] Japanese Patent Application Publication No. 2005-214086

[Patent Reference 4] Japanese Patent Application Publication No. 2006-77665

[Patent Reference 5] Japanese Patent Application Publication No. 2001-171388

[Patent Reference 6] Japanese Patent Application Publication No. 2006-57484

[Patent Reference 7] Japanese Patent Application Publication No. 2003-220851

DISCLOSURE OF THE INVENTION

Problems to be Solved by the Invention

The meter ECU (display control apparatus) can use same control program in each vehicle because the calculation content executed by the meter ECU is same even thought the instrument panel design of the vehicle is different.

However, if the meter ECU executes the determination of the eco-drive state as described above, the control program should be changed according to a vehicle.

This means that the control program of the meter ECU should be changed if the engine is changed because the determination of the eco-drive state of the vehicle depends on the engine.

In addition, if merely a result of the determination of the eco-drive state is reported, it is not only hard to know the relationship between the result and the operation, but also a guideline for improving the driving state is not clear.

That is to say that it is hard to know how much the driver needs to improve the driving operation to make the vehicle be in the eco-drive state. In addition, it is hard to know how far the driver can depress the accelerator pedal to keep the vehicle in the eco-drive state.

Merely displaying whether or not the vehicle is in the eco-drive state with LED and the like leads inconveniences. For example, the driver cannot know how much the driver needs to improve the driving state to make the vehicle be in the eco-drive state, and how far the driver can depress the accelerator pedal to keep the vehicle in the eco-drive state.

Assist information for eco-drive may be additionally displayed, but there may be an inconsistency among the eco-drive assist information multi-displayed. For example, if the driver drives the vehicle around a threshold value which separates eco-drive and non eco-drive, one display may display the eco-drive state, and another display may display non eco-drive state. This kind of inconsistency may make the driver feel stress, and affect eco-drive.

The present invention is made in views of above circumstances, and the aim, of the present invention is to provide an eco-drive assist apparatus and an eco-drive assist information generating apparatus that can generate information indicating a degree of eco of a driving operation of a vehicle, and display it on a display device.

Another aim of the present invention is to provide an eco-drive assist information calculating apparatus, an eco-drive state display apparatus, an eco-drive assist system, and an eco-drive assist information calculating method that can provide a guideline of the operation for eco-drive.

Another aim of the present invention is to provide an eco-drive assist apparatus where multiple displays showing whether the vehicle is in an eco-drive state do not have an inconsistency.

Means for Solving the Problems

To achieve those aims, an eco-drive assist apparatus of the present invention is an eco-drive assist apparatus that shows a degree of eco of a driving operation of a vehicle by displaying a relative state to a judgment threshold value that fluctuates based on a driving state of the vehicle, the eco-drive assist apparatus including; an eco-drive assist information generating apparatus that calculates the judgment threshold value and a state quantity of eco-drive indicating a ratio to the judgment threshold value based on the driving state of the vehicle; and a display device that executes a display based on information transmitted from the eco-drive assist information generating apparatus, the eco-drive assist information generating apparatus transmitting the state quantity of eco-drive to the display device.

According to the present invention, it is possible to generate information indicating a degree of eco of a driving operation of a vehicle in the eco-drive assist apparatus, and display it on the display device.

In the above eco-drive assist apparatus, the display device is characterized by fixedly displaying a first figure indicating the judgment threshold value, and displays a second figure in a predetermined place relative to the first figure according to a ratio that the state quantity of eco-drive indicates.

Therefore, a degree of eco of a driving operation of a vehicle can be displayed in an easy-to-understand manner with graphic display.

In the above the eco-drive assist apparatus, the eco-drive assist information generating apparatus is characterized by transmitting information to the display device in a common data format regardless of a display design of the display device.

Therefore, the eco-drive assist information generating apparatus can create data in a common data format regardless of a design of the display device.

In the above eco-drive assist apparatus, the eco-drive assist information generating apparatus is characterized by not transmitting the judgment threshold value to the display device.

An eco-drive assist information generating apparatus of the present invention is an eco-drive assist information generating apparatus that generates information used to execute a display in a eco-drive assist apparatus that shows a degree of eco of a driving operation of a vehicle by displaying a relative state to a judgment threshold value that fluctuates based on a driving state of the vehicle, the eco-drive assist information generating apparatus, and has a composition including eco-judgment threshold value calculation means for calculating a judgment threshold value on basis of the driving state of the vehicle; eco-drive state quantity calculation means for calculating a state quantity of eco-drive indicating a ratio to the judgment threshold value based on a driving operation quantity of the vehicle; and transmission means for transmitting the state quantity of eco-drive to a display device that executes a display.

An eco-drive assist information calculation apparatus of the present invention has a composition including first calculation means for calculating a judgment threshold value used to judge whether a current driving state of a vehicle is an eco-drive state based on a first state quantity representing the driving state of the vehicle; and second calculation means for calculating an eco-drive assist information that indicates a ratio of a second state quantity representing a current driving state of the vehicle to the judgment threshold value.

According to the present invention, as a ratio of the second state quantity representing a driving state of the vehicle to the judgment threshold value for eco-drive can be obtained, it is possible to provide the guideline of the operation for eco-drive. This means that it is possible to show how much the driving operation should be improved for eco-drive, or how far the accelerator panel can be depressed to keep the vehicle in the eco-drive state.

In the above eco-drive assist information calculation apparatus, the first calculation means is characterized by calculating the judgment threshold value based on a map which stores a relation between the first state quantity and the judgment threshold value.

Therefore, the calculation of the judgment threshold value from a vehicle speed becomes easier.

The above eco-drive assist information calculation apparatus is characterized by including eco-drive information transmission means for transmitting the eco-drive assist information to make display means unit that displays an eco-drive state in real time execute a display based on the eco-drive assist information.

Therefore, it becomes possible to display the eco-drive state on the display means in real time.

An eco-drive state display apparatus the present invention is an eco-drive state display apparatus that displays an eco-drive state in real time, the eco-drive state display, and has a composition including display means for displaying an eco-drive state based on a boundary value that is calculated based on a state quantity representing a current driving state of a vehicle and distinguishes whether a current driving state of the vehicle is an eco-drive state or non eco-drive state, and a current value representing the current driving state of the vehicle to the boundary value, the display means fixedly-displaying a figure corresponding to a boundary value in a predetermined place in a display area, and changing a display form of a figure corresponding to the current value according to a relative relation of the current value to the boundary value.

An eco-drive assist system of the present invention has a composition including includes an eco-drive assist information calculation apparatus including: first calculation means for calculating a judgment threshold value used to judge whether a current driving state of a vehicle is an eco-drive state based on a first state quantity representing the driving state of the vehicle; and second calculation means for calculating eco-drive assist information that indicates a ratio of a second state quantity representing the current driving state of the vehicle to the judgment threshold value; and a display control apparatus that obtains the eco-drive assist information calculated by the second calculation means, and makes display means display the ratio of the second state quantity to the judgment threshold value.

In the above eco-drive assist system, the display control means is characterized by defining the judgment threshold value as an upper limit value of an eco range that makes it possible to determine an eco-drive state, and displaying a predetermined display indicating the second state quantity according to the ratio that the eco-drive assist information indicates on the eco-zone.

In the above eco-drive assist system, the display control means is characterized by displaying a non eco range that is a display range when the second state quantity is greater than the judgment threshold value in addition to the eco range.

An eco-drive assist information calculation method of the present invention has a step calculating a judgment threshold value used to judge whether a current driving state of a vehicle is an eco-drive state based on a first state quantity representing the driving state of the vehicle; and a step calculating an eco-drive assist information that indicates a ratio of a second state quantity representing a current driving state of the vehicle to the judgment threshold value.

An eco-drive assist apparatus of the present invention is an eco-drive assist apparatus characterized by including first display control means for showing whether a quantity of the eco-drive state representing a degree of eco of a driving state of a vehicle is greater than a first judgment threshold value used to judge whether the vehicle is in an eco-drive state with ON/OFF display, and second display control means for displaying the state quantity of eco-drive in a graphical manner so that a relative state to the first judgment threshold value displayed can be shown, the eco-drive assist apparatus, wherein the first display control means makes one of determinations that are changing a display state from ON to OFF and changing the display state from OFF to ON, based on a second judgment threshold value which is delayed by a predetermined amount from the first judgment threshold value, and the eco-drive assist apparatus including display state adjusting means changes one of display states controlled by the first display control means and the second display control means, so that the state of eco/non eco that the display controlled by the first display control means shows becomes same as the state of eco/non eco that the display controlled by the second display control means shows when a state that ON/OFF state controlled by the first display control means continues over a predetermined time because the state quantity of eco-drive exceeds the first judgment threshold value but does not exceed the second judgment threshold value According to the present invention, even though the eco-drive/non eco-drive state that the display controlled by the first display control means indicates does not consistent with the eco-drive/non eco-drive state that the display controlled by the second display control means indicates, it is possible to adjust the display state so that the inconsistency does not occur.

Therefore, the fuel economy can increase if the driver drives according to these displays.

An eco-drive assist apparatus of the present invention is an eco-drive assist apparatus characterized by including first display control means for showing whether a quantity of the eco-drive state representing a degree of eco of a driving state of a vehicle is greater than a first judgment threshold value used to determine whether the vehicle is in an eco-drive state with an ON/OFF display, and second display control means for displaying the state quantity of eco-drive in a graphical manner so that a relative state to the first judgment threshold value displayed can be shown, the eco-drive assist apparatus, wherein the first display control means makes one of determinations that are changing a display state from ON to OFF and changing the display state from OFF to ON, based on a second judgment threshold value which is delayed by a predetermined amount from the first judgment threshold value, and the eco-drive assist apparatus including a display state adjusting means that changes the ON/OFF state controlled by the first display control means when a state that the ON/OFF state controlled by the first display control means does not change because the state quantity of eco-drive exceeds the first judgment threshold value but does not exceed the second judgment threshold value continues over a predetermined time.

According to the present invention, even though the eco-drive/non eco-drive state that the display controlled by the first display control means indicates does not consistent with the eco-drive/non eco-drive state that the display controlled by the second display control means indicates, it is possible to adjust the display state so that the inconsistency does not occur.

Therefore, the fuel economy can increase if the driver drives according to these displays.

In the above eco-drive assist apparatus, the display state adjusting means is characterized by changing ON/OFF state controlled by the first display control means when a state that the state quantity of eco-drive is greater than or equal to the second judgment threshold value and less than or equal to the first judgment threshold value after exceeding the first judgment threshold value continues over a predetermined time under the condition that the second judgment threshold value is set to below the first judgment threshold value In the above eco-drive assist apparatus, the display state adjusting means is characterized by changing ON/OFF state controlled by the first display control means when a state that the state quantity of eco-drive is greater than or equal to the first judgment threshold value and less than or equal to the second judgment threshold value after falling below the first judgment threshold value continues over a predetermined time under the condition that the second judgment threshold value is set to above the first judgment threshold value.

Effects of the Invention

According to the present invention, it is possible to generate information indicating a degree of eco of a driving operation of a vehicle, and display it on a display device.

In addition, according to the present invention, it is possible to provide a guideline of an operation for eco-drive.

In addition, according to the present invention, it is possible to provide an eco-drive assist apparatus where multiple displays showing whether the vehicle is in the eco-drive state do not have inconsistency.

BRIEF DESCRIPTION OF DRAWINGS

FIG. 7 is a diagram illustrating a notice content of an eco status signal output from a notice content judgment unit to a notice control unit of a meter ECU;

FIG. 26 is a diagram illustrating a notice content of the eco state signal output from a notice content judgment unit of an HV-ECU to a notice control unit of a meter ECU;

BEST MODES FOR CARRYING OUT THE INVENTION

A description will now be given, with reference to drawings, of embodiments of the present invention.

[First Embodiment]

Figure 1:
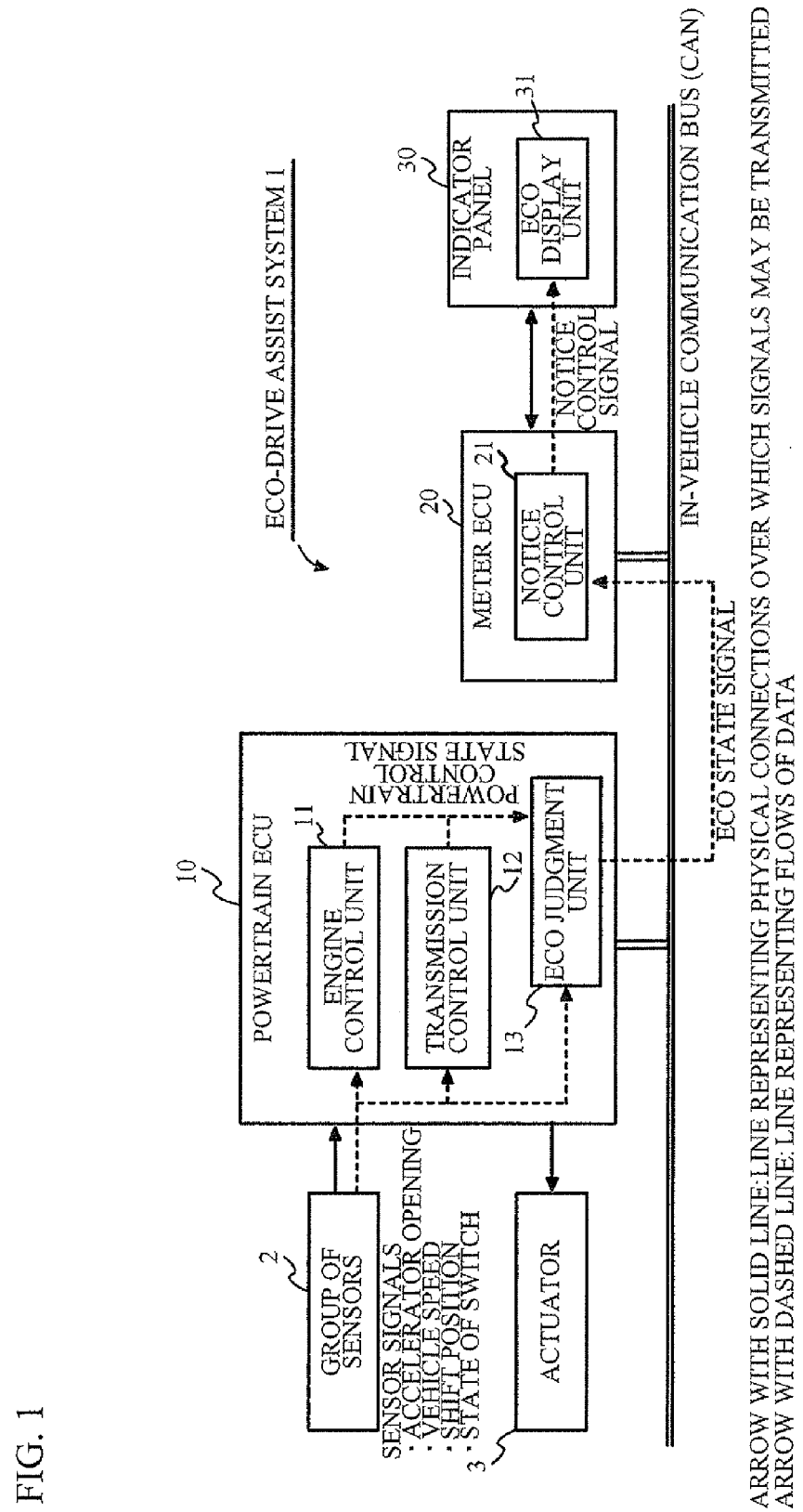
FIG. 1 is a diagram illustrating a composition of an eco-drive assist system.

Referring to FIG. 1, a description will now be given of a composition of the first embodiment. The definition of "eco" in this specification is both or one of economy and ecology. Economy means saving fuel by reducing fuel consumption. Ecology means reducing fossil fuel consumption and reducing emissions of toxic substances and carbon dioxide resulting from burning of fossil fuel.

An eco-drive assist system 1 illustrated in FIG. 1 has a system composition where a powertrain ECU 10 that controls an engine and a transmission is coupled with a meter ECU 20 that controls the display of an indicator panel 30 with an in-vehicle communication bus. In the present embodiment, the powertrain ECU 10 functions as an eco-drive assist information generating apparatus, and the meter ECU 20 functions as a display device. In FIG. 1, the powertrain ECU 10 and the meter ECU 20 are illustrated as ECUs coupled to the in-vehicle communication bus, but other ECUs may be coupled to the in-vehicle communication bus.

In FIG. 1, an arrow with a solid line shows physical connections over which signals may be transmitted, and an arrow with a dashed line shows flows of data.

The powertrain ECU 10 is provided with an engine control unit 11 that controls an engine as a control device, and a transmission control unit 12 that controls a transmission. The powertrain ECU 10 obtains sensor signals indicating an intake air mass, an air-oil ratio and the like from a group of sensors 2, and calculates control command values involved in the amount of fuel consumption, ignition timing, gear change timing, and the like based on obtained sensor signals. The powertrain ECU 10 controls an actuator 3 such as an injector and an ignition coil based on the calculation result.

A signal indicating a control state of the engine and the transmission (hereinafter, described as a powertrain control state signal) is output to an eco judgment unit 13 (described later) from the engine control unit 11 and the transmission control unit 12. To display the eco state more in detail, not only raw sensor information but also various control information of ECUs controlling the vehicle are transmitted.

In addition, sensor signals inputted to the powertrain ECU 10 from the group of sensors 2 may indicate accelerator opening measured by an accelerator opening sensor (not shown), a vehicle speed measured by a vehicle speed sensor (not shown), a shift position detected by a shift position sensor (not shown), and a switch state indicating the state of a switch for switching a vehicle control mode which may include a power mode and a sports mode.

Furthermore, the powertrain ECU 10 is provided with the eco judgment unit 13. The eco judgment unit 13 calculates a judgment threshold value, and a state quantity of eco-drive indicating a ratio to the judgment threshold value based on the driving state of the vehicle. In addition, the eco judgment unit 13 outputs an eco state signal indicating the state quantity of eco-drive to the meter ECU 20. The judgment threshold value and the state quantity of eco-drive will be described later.

The powertrain ECU 10 is coupled to the in-vehicle communication bus, and communicates with the meter ECU 20 coupled to this in-vehicle communication bus with communication protocol such as CAN (Controller Area Network).

The meter ECU 20 controls the display on the indicator panel 30, and includes a notice control unit 21.

The notice control unit 21 obtains the eco state signal indicating the degree of eco-drive of the vehicle from the eco judgment unit 13, and switches the display on the indicator panel 30 based on the eco state signal.

An eco display unit 31 is provided on the indicator panel 30, and shows whether the vehicle is in an eco-drive state or not. Exemplary contents of the eco display unit 31 will be described later.

Figure 2:
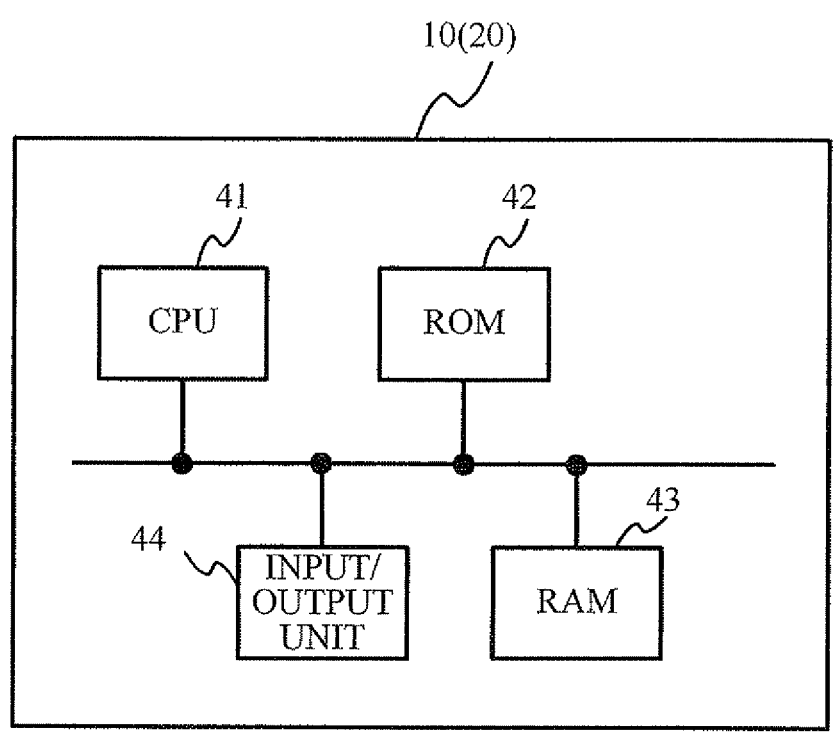
FIG. 2 is a block diagram illustrating a hardware structure of an ECU.

FIG. 2 illustrates a hardware structure of the powertrain ECU 10 and the meter ECU 20. As illustrated in FIG. 2, each ECU includes a central processing unit (CPU) 41, a ROM 42, a RAM 43, and an input/output unit 44 of data. The ROM 42 stores programs for control processes by ECUs and an eco judgment described later. The CPU 41 reads the programs stored in the ROM 42 and executes the programs. The RAM 43 stores temporary data used during the execution of programs.

Figure 3:
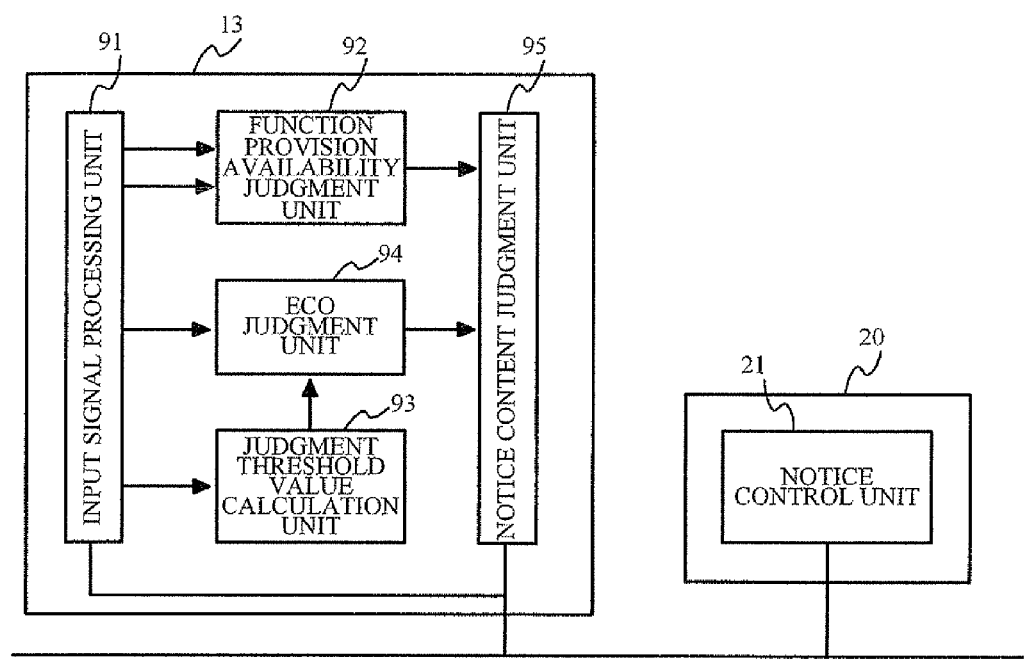
FIG. 3 is a diagram illustrating a composition of an eco judgment unit.

FIG. 3 illustrates a composition of the eco judgment unit 13. The eco judgment unit 13 is provided with an input signal processing unit 91, a function provision availability judgment unit 92, a judgment threshold value calculation unit 93, an eco judgment unit 94, and a notice content judgment unit 95.

The input signal processing unit 91 receives powertrain control state signals from the engine control unit 11 or the transmission control unit 12. In addition, an accelerator opening (%) which indicates the amount of the degree of depressing the accelerator pedal, a vehicle speed (km/h), information of the shift position, a state signal of switches are received as sensor signals.

The input signal processing unit 91 receives these signals, removes noise by filtering, and shapes signal waveforms.

The function provision availability judgment unit 92 receives a signal of which signal waveforms are shaped by the input signal processing unit 91, and judges whether the signal is within the normal range or not. That is to say that the function provision availability judgment unit 92 judges whether the sensor outputting the signal operates normally.

In addition, the function provision availability judgment unit 92 judges whether the vehicle state is in the state capable of providing the information to assist eco-drive with failure information received from the engine control unit 11 or the transmission control unit 12.

For example, if the shift position is not in the drive range and is in the parking or reverse position, it is not necessary to display the information for assisting eco-drive on the eco display unit 31. If the vehicle is in the failure state, it is not necessary to display the information for assisting eco-drive either.

The function provision availability judgment unit 92 judges whether to display or not the information for assisting eco-drive, and outputs a signal indicating the judgment result to the notice content judgment unit 95.

Figure 4:
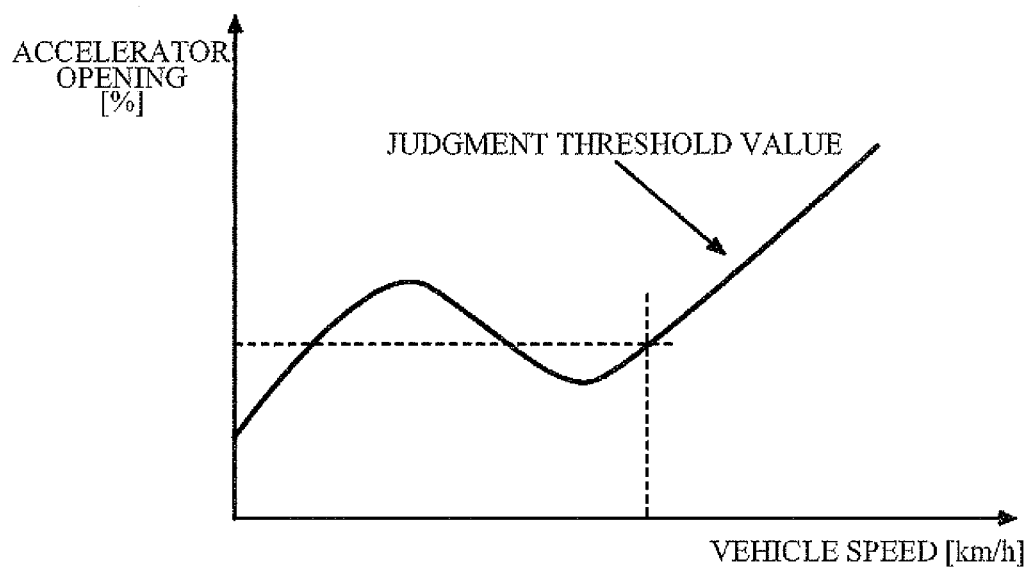
FIG. 4 is a diagram illustrating an example of a map to calculate a judgment threshold value of an accelerator opening from a vehicle speed.

The judgment threshold value calculation unit 93 receives a vehicle speed (km/h) from the input signal processing unit 91. The judgment threshold value calculation unit 93 stores a map illustrated in FIG. 4, refers to the map, and obtains the upper limit value of the accelerator opening that makes it possible to determine that the vehicle is in the eco-drive state at the current speed. Hereinafter, the above upper limit value may be referred to as a judgment threshold value. The map illustrated in FIG. 4 shows the relation between a vehicle speed and an accelerator opening (%) that makes it possible to determine that the vehicle is in the eco-drive state at the vehicle speed.

The judgment threshold value calculation unit 93 obtains the judgment threshold value of the accelerator opening (%) by referring to the map, and outputs the obtained judgment threshold value to the eco judgment unit 94.

The eco judgment unit 95 receives the judgment threshold value from the judgment threshold value calculation unit 93. The eco judgment unit 94 compares the received judgment threshold value with the current accelerator opening measured by the group of sensors 2, and determines whether lighting up an eco lamp (described later) or not.

The notice content judgment unit 95 calculates the state quantity of eco-drive from the judgment threshold value and the accelerator opening obtained from measured data by sensors. Based on this state quantity of eco-drive, the eco state signal noticed to the meter ECU20 is generated. The state quantity of eco-drive can be calculated with the following formula (1).

$$\text{state quantity of eco-drive} = ((\text{current accelerator opening}/\text{judgment threshold value}) \times 100) \, (\%) \quad (1)$$

Figure 5A:
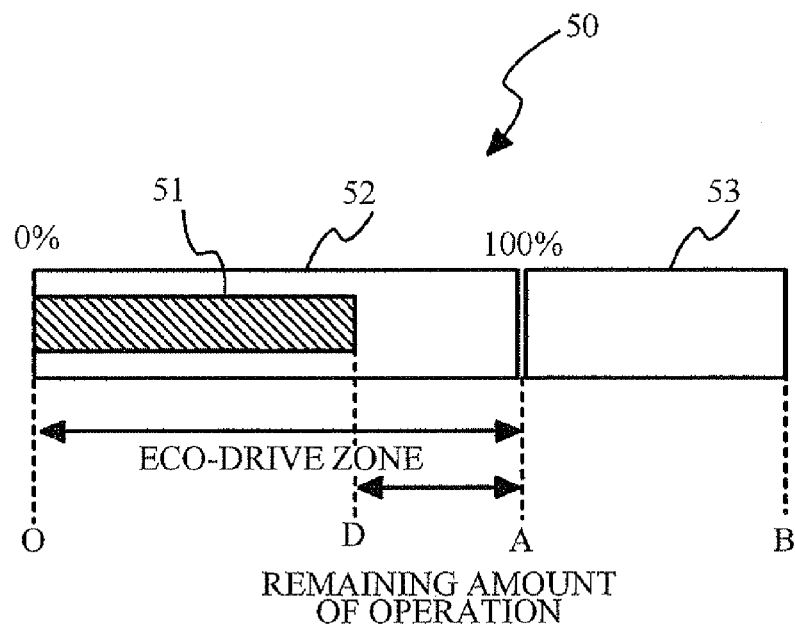
FIG. 5 is a diagram illustrating an eco bar indicator, 5A is a diagram illustrating a case that a state quantity is within an eco-drive zone, and 5B is a diagram illustrating a case that a state quantity is within a non eco-drive zone.
Figure 5B:
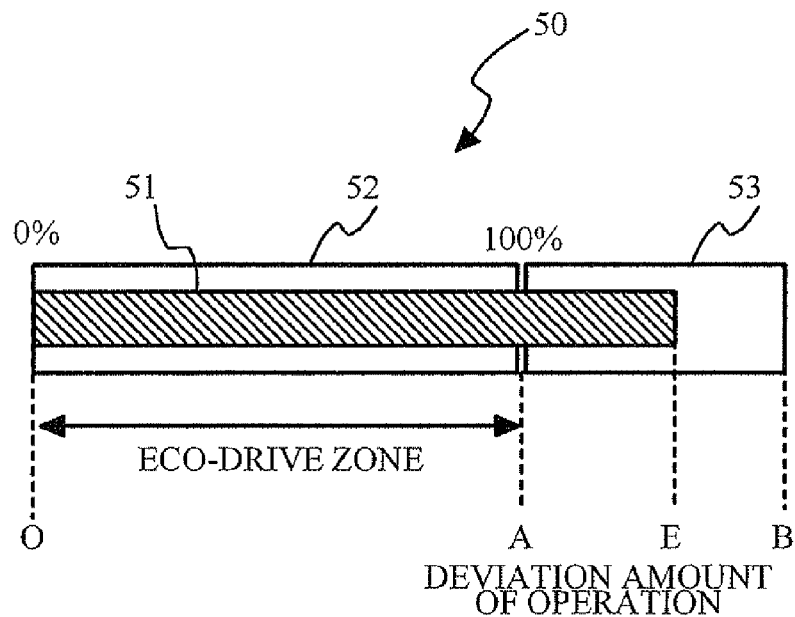

FIGS. 5A and 5B illustrate display examples displayed in the eco display unit 31 on the indicator panel 30. In these display examples, an eco bar indicator 50, which indicates a relative state to the judgment threshold value that fluctuates based on the driving state of the vehicle, is displayed.

The eco bar indicator 50 includes a bar indicator 51 indicating the state quantity of eco-drive that represents a current eco-drive state of the vehicle, a eco-drive zone 52 (section OA in FIG. 5A) that makes it possible to determine that the vehicles is in the eco-drive state, and a non eco-drive zone 53 (section AB in FIG. 5A) that makes it possible to determine that the vehicle is not in the eco-drive state.

A partition line at the point A in FIG. 5A indicates an upper limit value of the eco-drive zone 52 (the judgment threshold value), and indicates a boundary line between the eco-drive zone 52 and the non eco-drive zone 53. The partition line at the point A corresponds to a first figure. When the state quantity of eco-drive is equal to the judgment threshold value A, the state quantity of eco-drive is 100%.

The eco bar indicator 50 shows how ideal the current state quantity of eco-drive is compared to the ideal eco-drive zone (the eco-drive zone 52) by the ratio (a relative ratio) to the judgment threshold value of the eco-drive zone 52 which represents 100%. The first figure representing the judgment threshold value is displayed fixedly, and a bar indicator 51 which is a second figure is displayed in the predetermined place relative to the first figure according to the ratio of the state quantity of eco-drive.

When the state quantity of eco-drive is within the eco-drive zone 52, a remaining amount of operation to the judgment threshold value for eco-drive can be shown. In FIG. 5A, the section DA shows the remaining amount.

When the state quantity of eco-drive is within the non eco-drive zone 53, a deviation amount of operation from the judgment threshold value for eco-drive can be shown. In FIG. 5B, the section AE shows the deviation amount of operation.

Figure 6:
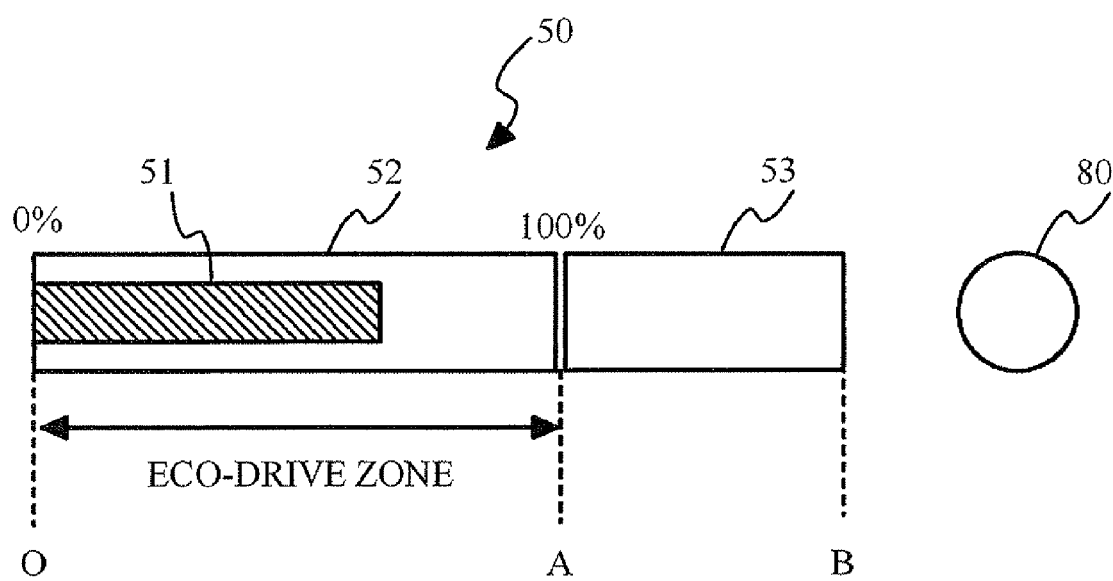
FIG. 6 is a diagram illustrating an example that displays a display of an eco lamp in addition to the eco bar indicator.

An eco lamp 80 may be displayed together with the eco bar indicator 50 as illustrated in FIG. 6. The display of the eco lamp 80 shows whether the vehicle is in the eco-drive state with a lamp such as an LED. The display of the eco lamp 80 lights up when the vehicle is in the eco-drive state, and does not light up when the vehicle is not in the eco-drive state.

FIG. 7 illustrates the notice content of the eco state signal output from the notice content judgment unit 95 to the notice control unit 21 of the meter ECU20. The information noticed from the notice content judgment determination unit 95 to the meter ECU 20 by the eco state signal is the information in a common format which does not depend on the display design of the indicator panel 30.

The eco state signal noticed from the notice content judgment unit 95 to the notice control unit 21 includes an advice status (1 byte) and a signal (2 byte) that indicates the state quantity of eco zone display as illustrated in FIG. 7. The information noticed from the notice content judgment unit 95 to the meter ECU 20 does not include the judgment threshold value.

The vehicle state judged by the notice content judgment unit 95 includes five statuses: "fail", "exception" (which is the state in that the information for assisting eco-drive is not displayed), "parked", "non eco", and "eco". The notice content judgment unit 95 notices in which state of five states the vehicle is to the notice control unit 21 by the advice status signal which is 1-byte signal.

The notice control unit 21 turns off the eco lamp 80 when the status of the advice status signal is "fail", "exception", "parked", or "non eco". The notice control unit 21 turns on the eco lamp 80 when the status of the advice status signal is "eco".

When the notice content judgment unit 95 judges that the failure occurs in the vehicle, it outputs a signal of which the state quantity of eco zone display is set to a predetermined value representing "fail" to the notice control unit 21.

In the same manner, when the vehicle is in the state that it is not necessary to display the information for assisting eco-drive, the notice content judgment unit 95 outputs a signal of which the state quantity of eco zone display is set to the predetermined value representing "exception" to the notice control unit 21.

When the notice content judgment unit 95 judges that the vehicle is parked, it outputs a signal of which the state quantity of eco zone display is set to the predetermined value representing "parked" to the notice control unit 21.

In addition, when the notice content judgment unit 95 judges that the driving state of the vehicle is the non eco-drive state, it outputs a signal of which the state quantity of eco zone display is set to greater than 100% and less than or equal to 120% to the notice control unit 21.

When the notice content judgment unit 95 judges that the driving state of the vehicle is the eco-drive state, it outputs a signal of which the state quantity of eco zone display is set to greater than or equal to 0% and less than or equal to 100% to the notice control unit 21.

Figure 8:
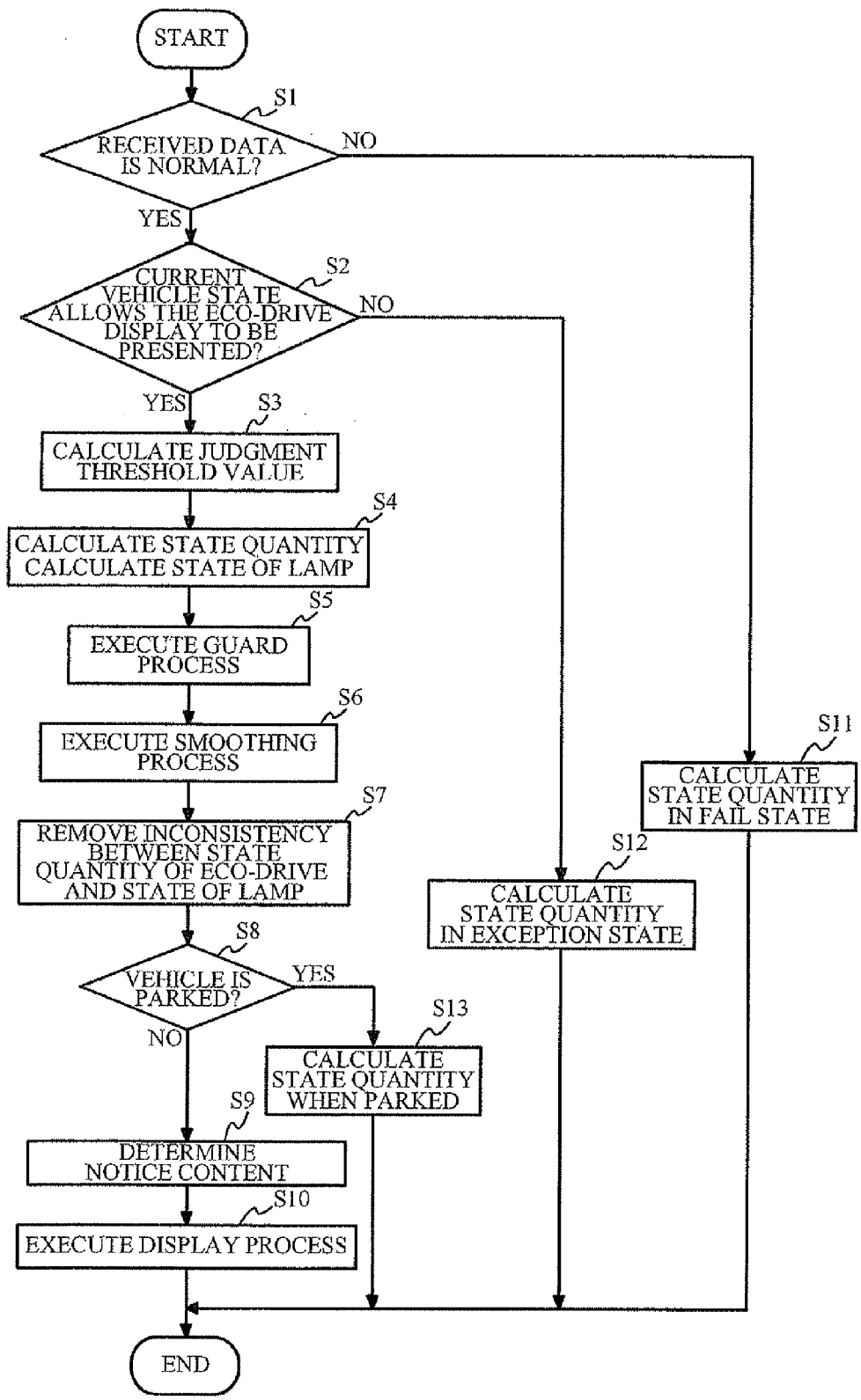
FIG. 8 is a flowchart illustrating a procedure of an eco judgment unit.

Referring to a flowchart illustrated in FIG. 8, a description will now be given of processes of the eco judgment unit 13 for displaying above information in the eco display unit 31 on the indicator panel 30.

When the eco judgment unit 13 receives measured data from the group of sensors 2, it determines whether the received data are normal (step S1). The eco judgment unit 13 determines whether the group of sensors 2 operates normally by checking the received data. For example, if identical data is continuously input over a predetermined time, it is determined that the abnormal fixing occurs in the group of sensors 2.

When the eco judgment unit 13 determines that the measured data are abnormal (step S1/NO), it calculates 0% as the state quantity of eco-drive in the fail state of the group of sensors 2 (step S11).

When the eco judgment unit 13 determines that the measured data are normal (step S1/YES), it determines whether the current vehicle state allows the eco-drive display (the eco bar indicator 50, and the display of the eco lamp 80) to be presented to the user (step S2). When the shift lever is at the reverse or parking position or a signal having a power switch ON is input, it is determined that the eco-drive display cannot be presented to the user because the state does not allow the proper eco-drive display to be presented or the user does not want the eco-drive display.

When the eco judgment unit 13 determines that the eco-drive display is not allowed to be presented (step S2/NO), it calculates 0% as the state quantity of eco-drive in the exception state (step S12).

The eco judgment unit 13 refers to the map illustrated in FIG. 4, and obtains the judgment threshold value for eco-drive (step S3).

The judgment threshold value of the accelerator opening is obtained from the map based on the vehicle speed measured by a sensor 2 (a vehicle speed sensor).

The map illustrated in FIG. 4 stores relations between the vehicle speeds and the judgment threshold values of the accelerator opening that makes it possible to determine that the vehicle is in the eco-drive state. The eco judgment unit 13 holds the map illustrated in FIG. 4, and obtains the judgment threshold value of the accelerator opening (%) from the vehicle speed measured by the group of sensors 2.

The eco judgment unit 13 calculates the state quantity of eco-drive by using the judgment threshold value obtained in the step S3 and the current accelerator opening calculated from the data measured by the group of sensors 2 (step S4). The state quantity of eco-drive can be calculated with the formula (1) described above.

After calculating the state quantity of eco-drive, the eco judgment unit 13 determines whether turning on or turning off the eco lamp 80 by using the calculated state quantity of eco-drive (step S4). That is to say that if the state quantity of eco-drive is less than or equal to 100%, the eco lamp 80 is turned on because the vehicle is in the eco-drive state. If the state quantity of eco-drive is greater than 100%, the eco-lamp 80 is turned off because the vehicle is in the non eco-drive state.

The eco judgment unit 13 executes a guard process (step S5). The guard process is a process for preventing the inconsistency between the display of the eco lamp 80 and the eco bar indicator 50.

Figure 9:
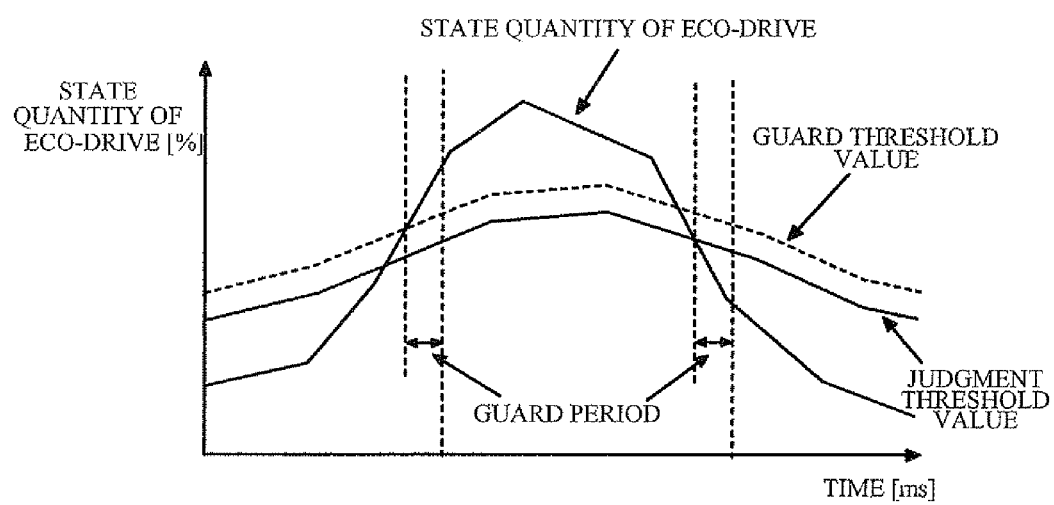
FIG. 9 is a diagram to explain a guard process, and is a diagram illustrating a guard threshold value and a guard period.

The eco judgment unit 13 calculates the guard threshold value by adding the given value to the judgment threshold value as illustrated in FIG. 9. The guard threshold value is illustrated with a dashed line in FIG. 9.

Figure 10:
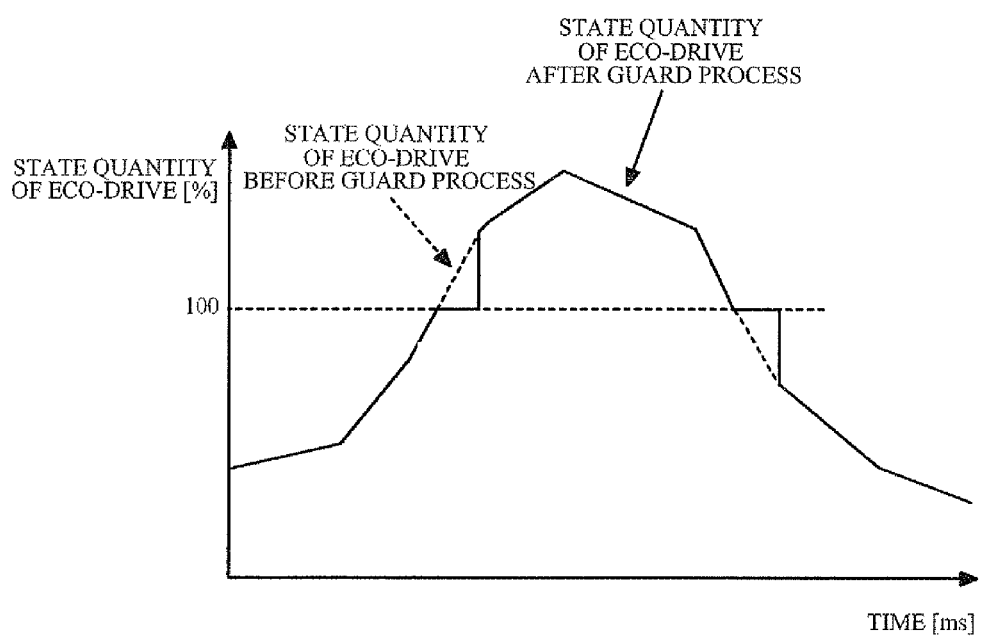
FIG. 10 is a diagram to explain a guard process, and is a diagram illustrating a state quantity after the guard process.

The eco judgment unit 13 determines whether the accelerator opening (%) rises or falls. When the accelerator opening rises, a given period after the accelerator opening exceeds the guard threshold value is set to a guard period (see FIG. 9). When the accelerator opening falls, a given period after the accelerator opening falls below the judgment threshold value is set to the guard period (refer to FIG. 9). During the guard period, the state quantity of eco-drive is changed so that the state quantity of eco-drive does not fluctuate. That is to say that the state quantity of eco-drive is maintained at 100% during the guard period. The state quantity of eco-drive after the guard process is illustrated in FIG. 10.

Then the eco judgment unit 13 executes a smoothing process (step S6). To suppress the temporary change of the state quantity of eco-drive caused by noise, and the abrupt change of the state quantity of eco-drive, the smoothing process is executed according to the formula (2) expressed as follows.

$$P_{(n)} = (1-D)P_{(n-1)} + D \times P \quad (2)$$

P expresses the state quantity of eco-drive, P(n) expresses the current value of the state quantity of eco-drive after the smoothing process, and P(n−1) is the previous value of the state quantity of eco-drive. D is a smoothing constant value.

In addition to this, it may be possible to execute processes such as calculating a moving average by adding the state quantity of eco-drive which is generated every time inputting the measured data from the group sensors 2 the given times, rate limit, and output value filtering process.

Figure 11:
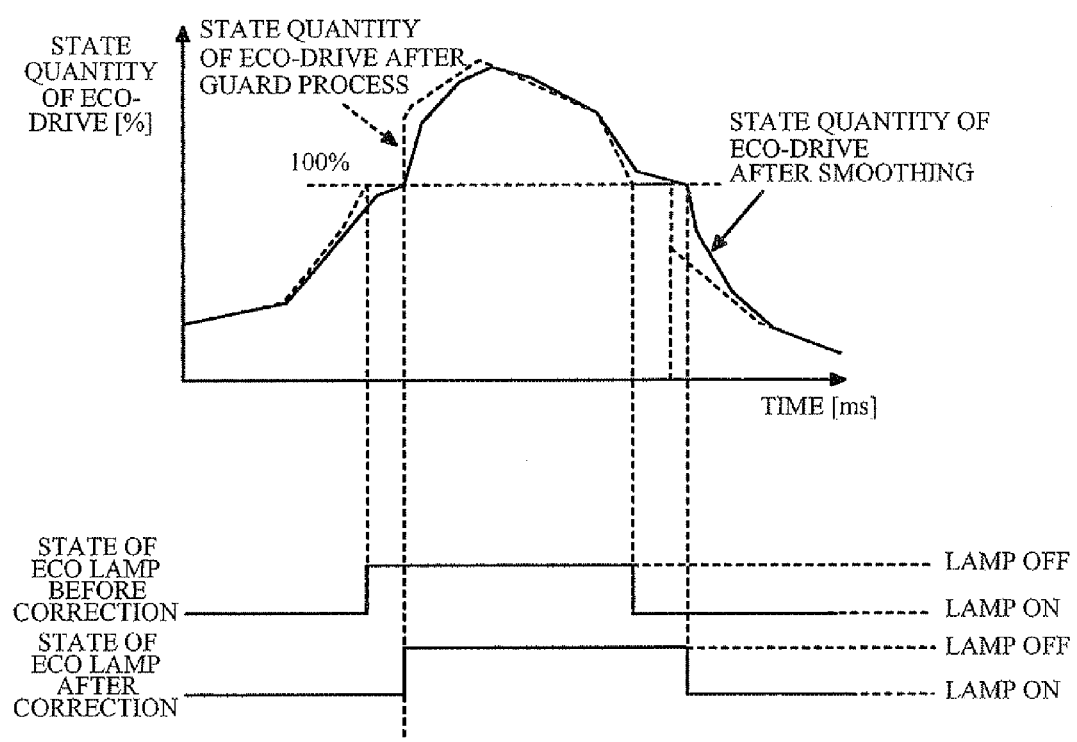
FIG. 11 is a diagram illustrating a state quantity after a smoothing process, and process to adjust a timing of lighting on/off of the eco lamp in accordance with the state quantity after the smoothing process.

The eco judgment unit 13 executes a process for removing the inconsistency between the state quantity of eco-drive after the smoothing process and the display state of the eco lamp (step S7). That is to say that the lighting on/off of the eco-lamp is switched in accordance with timing that the state quantity of eco-drive after the smoothing process is 100% as illustrated in FIG. 11.

The eco judgment unit 13 determines whether the vehicle is currently parked or not (step S8). Whether the vehicle is in parked is determined based on the vehicle speed input from the group of sensors 2. For example, when the vehicle speed falls below 2 km/h, it is determined that the vehicle is parked, and when the vehicle speed exceeds 4 km/h, it is determined that the vehicle is traveling. When the vehicle speed is between 2 km/h and 4 km/h, the determination of whether the vehicle is parked is not made, and is made to be ready until the vehicle speed changes.

When it is determined that the vehicle is parked (step S8/YES), 0% is calculated as the state quantity of eco-drive when the vehicle is parked (step S13).

The eco judgment unit 13 determines the notice content noticed to the meter ECU 20 (step S9). The eco judgment unit 13 notices the information indicating the calculated state quantity of eco-drive and the display state of the eco lamp 80 to the meter ECU 20. The meter ECU 20 displays the display of the eco lamp 80 and the eco bar indicator based on the information of the state quantity of eco-drive and the display state of the eco lamp 80 noticed by the eco judgment unit 13 (step S10).

According to the present embodiment, it is possible to generate the beneficial information for assisting eco-drive in the eco judgment unit 13, and to transmit it to the meter ECU 20 functioning as a display control apparatus. As the ratio to the judgment threshold value of the accelerator opening indicating the driving state of the vehicle is shown, it is possible to show how much the driving operation should be improved for eco-drive, or how far the accelerator pedal can be depressed to keep the vehicle in the eco-drive state.

In the above embodiment, the eco judgment unit is provided to the control device of the vehicle (a powertrain ECU, an HV-ECU), and the state quantity of eco-drive of the vehicle is calculated based on the vehicle speed and the like and is displayed in real time. In addition to this, it may be possible to display the moment-to-moment change of the state quantity of eco-drive by recording the vehicle speed and the state quantity of eco-drive to the recording medium and the like, and reading the contents recorded in the recording medium to the computer apparatus after getting out of the vehicle.

[Second Embodiment]

Figure 12:
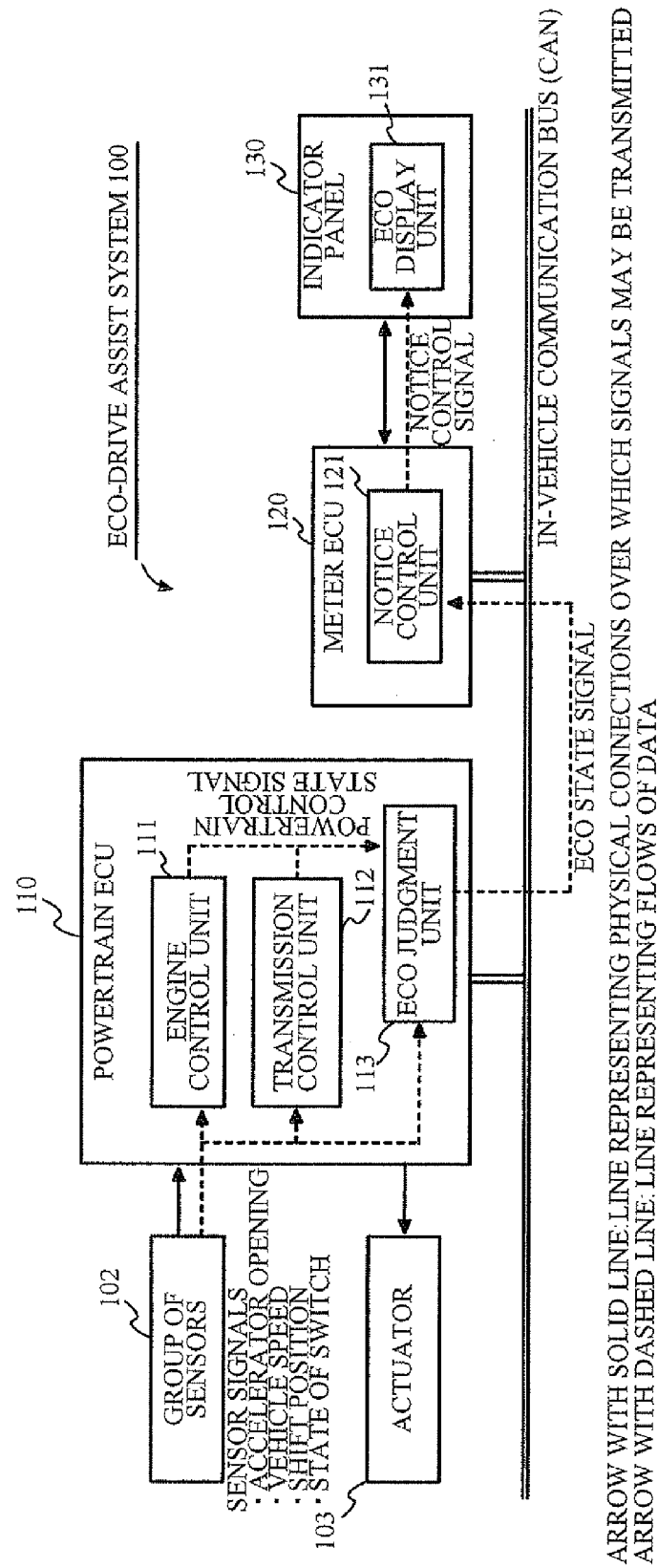
FIG. 12 is a diagram illustrating the composition of an eco-drive assist system in accordance with a second embodiment.

Referring to FIG. 12, a description will be given of the composition of the present embodiment.

An eco-drive assist system 100 illustrated in FIG. 12 has a system composition where a powertrain ECU 100 which controls an engine and a transmission is coupled to a meter ECU 120 which controls a display of an indicator panel 130 with an in-vehicle communication bus. In the present embodiment, the powertrain ECU 100 functions as an eco-drive assist information calculation apparatus, and the meter ECU 120 functions as an eco-drive state display apparatus. In FIG. 12, the powertrain ECU 110 and the meter ECU 120 are illustrated as ECUs coupled to the in-vehicle communication bus, but other ECUs may be coupled to the in-vehicle communication bus.

In FIG. 12, an arrow with a solid line shows physical connections over which signals may be transmitted, and an arrow with a dashed line shows flows of data.

The powertrain ECU 110 is provided with an engine control unit 111 that controls an engine as a control device, and a transmission control unit 112 that controls a transmission. The powertrain ECU 110 obtains sensor signals indicating an intake air mass, an air-oil ratio and the like from a group of sensors 102, and calculates control command values involved in the amount of fuel consumption, ignition timing, gear change timing, and the like based on obtained sensor signals. The powertrain ECU 110 controls an actuator 103 such as an injector and an ignition coil based on the calculation result.

A signal (a powertrain control state signal) indicating the control state of the engine and the transmission is output to an eco judgment unit 113 (described later) from the engine control unit 111 and the transmission control unit 112. To display the eco state more in detail, not only raw sensor information but also various control information of ECUs controlling the vehicle may be transmitted.

Sensor signals input to the powertrain ECU 110 from the group of sensors 102 may indicate accelerator opening measured by an accelerator opening sensor (not shown), a vehicle speed measured by a vehicle speed sensor (not shown), a shift position detected by a shift position sensor (not shown), and a switch state indicating the state of a switch for switching a vehicle control mode which may include a power mode and a sports mode.

Furthermore, the powertrain ECU 110 is provided with the eco judgment unit 113, and determines whether the driving state of the vehicle is a state that makes it possible to determine that the vehicle is in the eco-drive state.

The eco judgment unit 13 functions as a transmission unit (an eco-drive information transmission unit) that transmits the eco state signal indicating whether the vehicle is in the eco-drive state to the meter ECU 120 to display the eco-drive state in the eco display unit 131 on the indicator panel 130 in real time. The detail of the eco judgment unit 113 will be described later.

The powertrain ECU 110 is coupled to the in-vehicle communication bus, and communicates with the meter ECU 120 coupled to the in-vehicle communication bus with communication protocol such as CAN (Controller Area Network).

The meter ECU 120 controls the display on the indicator panel 130, especially in the present embodiment, obtains the eco state signal indicating the degree of eco-drive of the vehicle from the eco judgment unit 113, and makes the eco display unit 131 on the indicator panel 130 display the eco-drive state based on the eco state signal in real time.

The eco display unit 131 is provided on the indicator panel 130 and shows whether the vehicle is in the eco-drive state or not. The eco display unit 131 displays shows whether the vehicle is in the eco-drive state in real time based on the control of a notice control unit 121. Exemplary contents of the eco display unit 131 will be described later.

Figure 13:
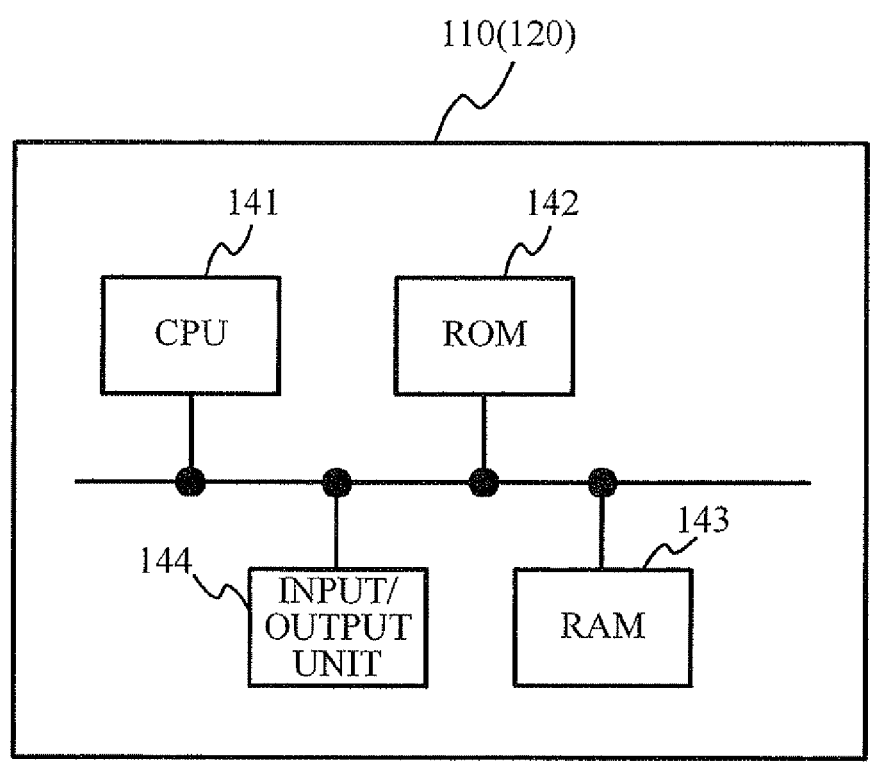
FIG. 13 is a block diagram illustrating a hardware structure of an ECU.

FIG. 13 illustrates an exemplary hardware structure of the powertrain ECU 110 and the meter ECU 120. As illustrated in FIG. 13, each ECU includes a ROM 142, a CPU 141, a RAM 143, and an input/output unit 144 of data. The ROM 142 stores programs used to realize controls by the ECUs and programs for an eco judgment (described later). The CPU 141 reads the programs stored in the ROM 142, and executes the programs. The RAM 143 stores temporary data used during the execution of the programs.

In the present embodiment, whether the vehicle is in the eco-drive state or not is determined, and the remaining amount of the operation indicating how much operation can be increased is displayed when it is determined that the vehicle is in the eco-drive state.

In addition, when the vehicle is in the non eco-drive state, the deviation amount of operation indicating how far the operation should be improved so that it is determined that the vehicle is in the eco-drive state is displayed.

Figure 14A:
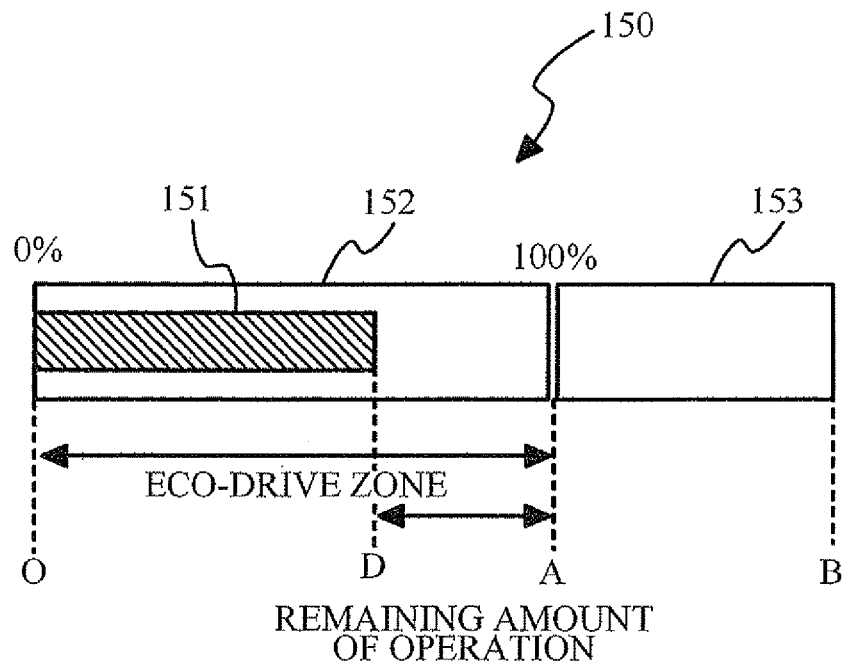
FIG. 14 is a diagram illustrating an eco bar indicator, 14A illustrates a case that a state quantity is within an eco-drive zone, and 14B illustrates a case that a state quantity is within a non eco-drive zone.
Figure 14B:
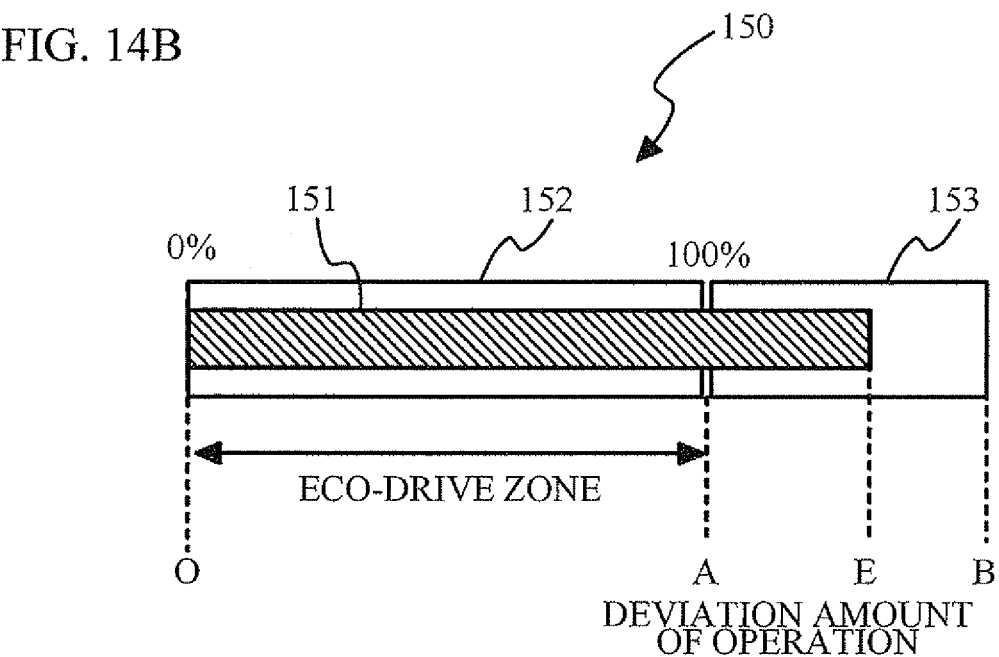

Display examples displayed in the eco display unit 131 on the indicator panel 130 are illustrated in FIGS. 14A and 14B.

In these display examples, a bar indicator (hereinafter, referenced as a bar indicator 151), an eco-drive zone 152 (section OA in FIGS. 14A and 14B), and a non eco-drive zone 153 (section AB in FIGS. 14A and 14B) are displayed. The bar indicator 151 shows the state quantity of eco-drive indicating the degree of eco-drive of the vehicle (corresponding to the eco-drive assist information of the present invention) with bar expression, and corresponds to the predetermined display indicating the second state quantity according to the ratio that the eco-drive assist information indicates of the present invention. The eco-drive zone 152 is a zone that makes it possible to determine that the vehicle is in the eco-drive state, and corresponds to an eco range of the present invention. The non eco-drive zone 152 is a zone that makes it possible to determine that the vehicle is not in the eco-drive state, and corresponds to a non eco range of the present invention. This display is referenced as an eco display, hereinafter.

How ideal the state quantity of eco-drive is compared to compared to the ideal eco-drive zone 152 is shown by the ratio (a relative ratio) to the upper limit of the eco-drive which represents 100%.

A point "A" illustrated in FIGS. 14A and 14B shows the upper limit value of the eco-drive zone (hereinafter, this value is referenced as a judgment threshold value which corresponds to a boundary value claimed in claim 9), and shows that the state quantity of eco-drive is 100%. A point "O" shows a state that the state quantity of eco-drive is 0%.

When the state quantity of eco-drive is within the eco-drive zone 152, the remaining amount of operation to the judgment threshold value can be shown. In the example illustrated in FIG. 14A, a section DA shows the remaining amount of operation.

When the state quantity of eco-drive is within the non eco-drive zone 153, a deviation amount of operation from the judgment threshold value for eco-drive can be shown. In the example illustrated in FIG. 14B, a section AE shows the deviation amount of operation.

Figure 15:
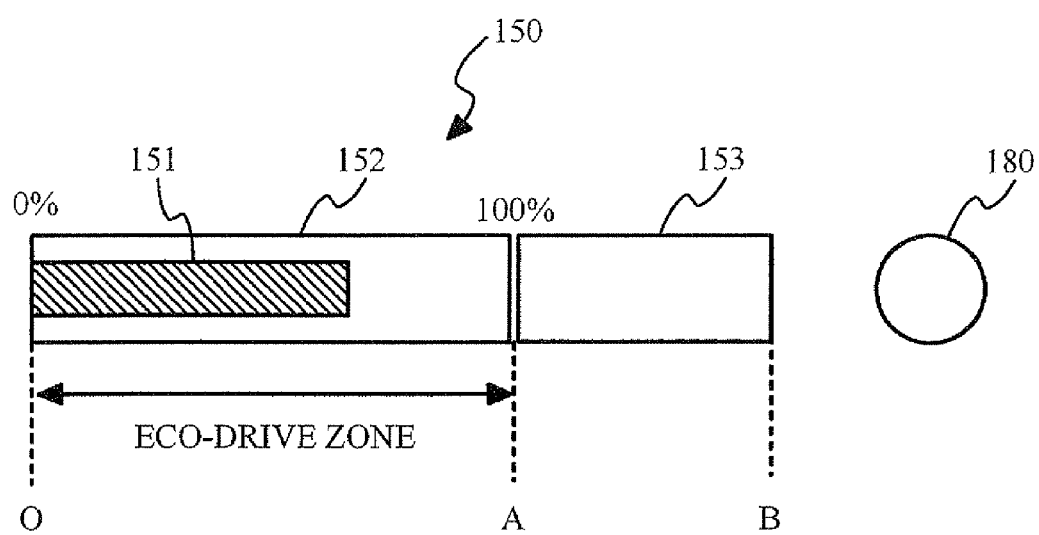
FIG. 15 is a diagram illustrating an example that displays a display of an eco lamp in addition to the eco bar indicator.

In addition to the eco bar indicator illustrated in FIGS. 14A and 14B, an eco lamp 180 illustrated in FIG. 15 may be displayed. The eco-lamp 180 shows whether the vehicle is in the eco-drive state with a lamp such as an LED (Light Emitting Diode). The eco lamp 180 lights up when the vehicle is in the eco-drive state, and does not light up when the vehicle is not in the eco-drive state.

As descriptions are already given of methods to calculate the state quantity of eco-drive and the judgment threshold value to determine whether the current driving state is the eco-drive state or non eco-drive state, and the like are already given in the first embodiment, detail descriptions are omitted.

As processes of the eco judgment 113 for displaying the eco bar indicator in the eco display unit 131 on the indicator panel 130 is already described with reference to FIG. 8 through FIG. 11, a detail description is omitted. The process of the meter ECU 20 in the step S10 of the flowchart in FIG. 8 includes a process to fix the figure (eco-drive zone 152, especially the boundary line A of the eco-drive zone 152 in the present embodiment) according to the judgment threshold value (the boundary value) to the predetermined place in the display region, and to change display form of the figure according to the current value (the accelerator opening in the present invention) in response to the relative relation of the current value to the boundary value. Changing the display form includes changing the display position of the figure other than changing the size or form of the figure.

According to the present embodiment, as the state quantity of eco-drive which indicates the degree of eco-drive of the vehicle can be shown, the operation guideline for eco-drive can be provided. It is possible to show how much the driving operation should be improved for eco-drive, or how far the accelerator pedal can be depressed to keep the vehicle in the eco-drive state.

[Third Embodiment]

Figure 16:
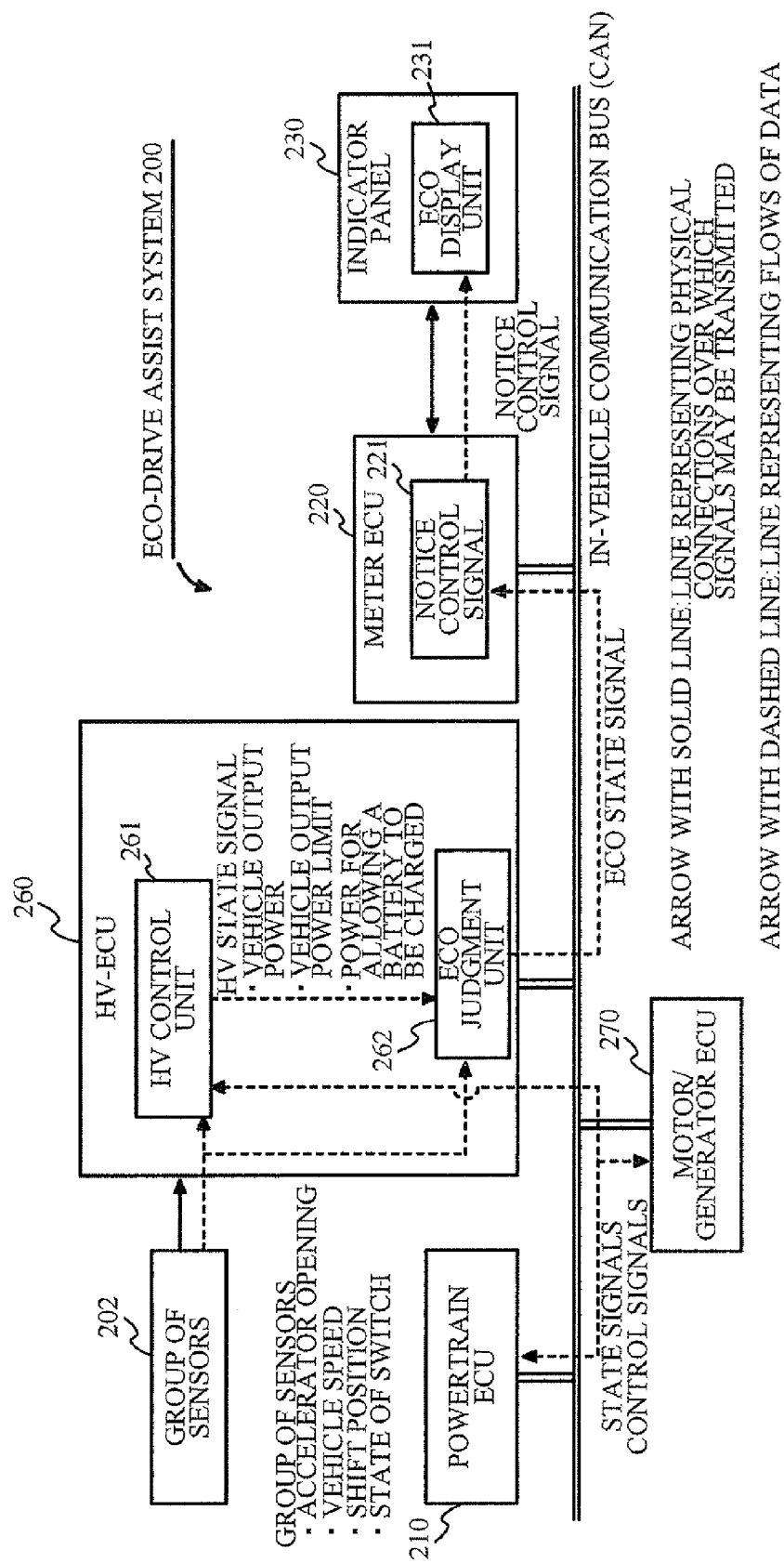
FIG. 16 is a diagram illustrating a composition of an eco-drive assist system in accordance with third, fourth, and fifth embodiments.

Referring to FIG. 16, a description will now be give of the composition of the present embodiment.

An eco-drive assist system 200 illustrated in FIG. 16 has a system composition where a powertrain ECU (Electronic Control Unit) 210 which controls an engine and a transmission is coupled with an HV-ECU 260 which controls a hybrid system, a meter ECU 220 which controls an indicator panel 230, and a motor/generator ECU 270 which controls a motor and a generator with an in-vehicle communication bus. In the present embodiment, the HV-ECU 260 functions as an eco-drive assist apparatus. In FIG. 16, the powertrain ECU 210, the meter ECU 220, the HV-ECU 260, and the motor/generator ECU 270 are illustrated as ECUs coupled to the in-vehicle communication bus, but other ECUs may be coupled to the in-vehicle communication bus.

In FIG. 16, an arrow with a solid line shows physical connections over which signals may be transmitted, and an arrow with a dashed line show flows of data.

The powertrain ECU 210 obtains sensor signals indicating an intake air mass, an air-oil ratio, and the like from a group of sensors 202, and calculates control command values involved in the amount of fuel consumption, ignition timing, gear change timing and the like based on obtained sensor signals. The powertrain ECU 210 controls an actuator such as an injector and an ignition coil based on the calculation result.

The HV-ECU 260 communicates with a battery ECU (not illustrated), an engine ECU (not illustrated) and the motor/generator ECU 270, and controls the overall hybrid system so that the hybrid vehicle can travel most efficiently. The HV-ECU 260 is provided with an HV control unit 261 and an eco judgment unit 262 as illustrated in FIG. 16.

The HV control unit 261 receives sensor signals measured by the group of sensors 202 and signals from other ECUs, and generates control signals for controlling the hybrid system. The HV control unit 261 outputs an HV state signal that indicates the state of the HV system to the eco judgment unit 262. This HV state signal includes vehicle power, vehicle output power limit, and power for allowing a battery to be charged.

The eco judgment unit 262 receives the HV state signal output from the HV control unit 261 and sensor signals output from the group of sensors 202, and calculates the state quantity of eco-drive indicating a degree of eco of the driving state of the vehicle. The eco judgment unit 262 corresponds to the first display control unit, the second display control unit, and the display state adjustment unit of the present invention. The details of the state quantity of eco-drive will be described later. The sensor signals input to the eco judgment unit 262 includes an accelerator opening measured by an accelerator opening sensor (not illustrated), a vehicle speed measured by a vehicle speed sensor (not illustrated), a shift position detected by a shift position sensor (not illustrated), and the state of a switch for switching a vehicle control mode which may include a power mode and a sports mode.

The eco judgment unit 262 judges, on the basis of the calculated state quantity of eco-drive, whether the current driving state of the vehicle is the eco-drive state or the non eco-drive state. The details of this process will be described later.

The eco judgment unit 262 outputs the eco state signal indicating the state quantity of eco-drive and the judgment result about the current eco-drive state of the vehicle to a notice control unit 221 of the meter ECU 220.

A description will now be given of the state quantity of eco-drive created by the eco judgment unit 262.

The state quantity of eco-drive created in the present embodiment is calculated on the basis of the vehicle power. The vehicle power may be referred to as electric power, and is the sum of the product of the torque and revolution of the engine and the product of the torque and revolution of the motor. The hybrid vehicle is equipped with a motor driven by electric power, and an engine. The vehicle power is a single reference that describes energy generated by the motor and energy generated by the engine.

The eco judgment unit 262 obtains the vehicle speed from the group of Sensors 202 and the current vehicle power of the vehicle from the HV control unit 261. Then, the eco judgment unit 262 refers to a map illustrated in FIG. 17, and obtains the judgment threshold value of the vehicle power that makes it possible to determine that the vehicle is in the eco-drive state at the current vehicle speed. The map shows a vehicle speed and an upper limit value of the vehicle power that makes it possible to determine that the vehicle is in the eco-drive state. Hereinafter, the upper limit value of the vehicle power is referenced as a judgment threshold value. Referring to the map illustrated in FIG. 17, the eco judgment unit 262 obtains the judgment threshold value of the vehicle power, and calculates the state quantity of eco-drive by dividing the current vehicle power obtained from the HV control unit 261 by the judgment threshold value and multiplying the divided value by 100 according to the formula (3).

$$\text{state quantity of eco-drive} = ((\text{current vehicle power}/\text{judgment threshold value}) \times 100)(\%) \quad (3)$$

The meter ECU 220 controls the display on the indicator panel 230. In the present embodiment, the meter ECU 220 obtains the eco state signal from the eco judgment unit 262, and makes the eco display unit 231 on the indicator panel 230 display the eco-drive state based on the eco state signal in real time.

The eco display unit 231 is provided on the indicator panel 230 and indicates whether the vehicle is in the eco-drive sate or not. The eco display unit 231 shows whether the vehicle is in the eco-drive state or not in real time on the basis of the control by the notice control unit 221. Exemplary contents of the eco-display unit 231 will be described later.

The motor/generator ECU 270 controls the drive of the motor and generator on the basis of state signals and control signals output from the HV-ECU 260.

Figure 18:
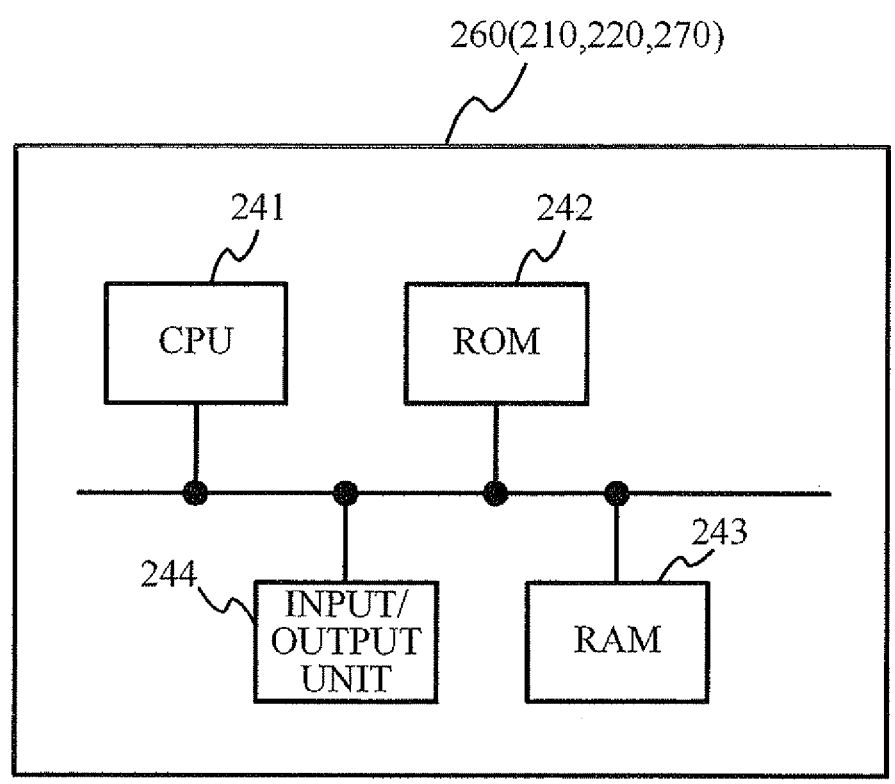
FIG. 18 is a block diagram illustrating a hardware structure of an ECU.

FIG. 18 illustrates an exemplary hardware structure of the HV-ECU 260, the powertrain ECU 210, and the meter ECU 220. As illustrated in FIG. 18, each ECU includes a ROM 242, a central processing unit (CPU) 241, a RAM 243, and an input/output unit 244 of data. The ROM 242 stores programs used to realize controls by ECUs and eco judgment. The CPU 241 reads the programs stored in the ROM 242 and executes the programs. The RAM 243 stores temporary data used during the execution of programs.

Figure 19A:
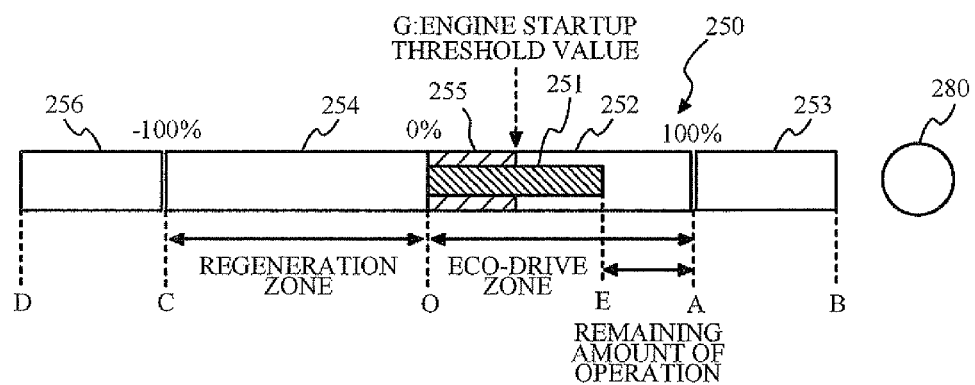
FIG. 19 is a diagram illustrating an eco bar indicator and a display of an eco lamp, 19A illustrates a case that a state quantity is within an eco-drive zone, and 19B illustrates a case that a state quantity is within a non eco-drive zone.
Figure 19B:
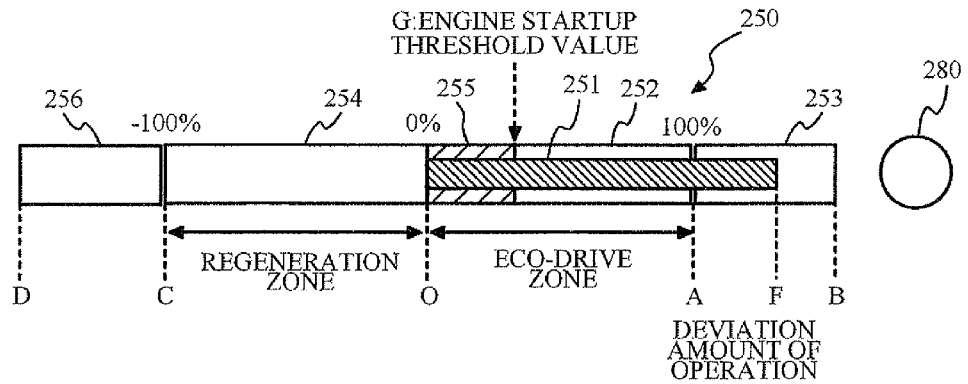

FIGS. 19A and 19B illustrate display examples displayed in the eco display unit 231 on the indicator panel 230.

In these display examples, the eco bar indicator 250 and the eco lamp 280 are illustrated.

The eco bar indicator 250 displays the state quantity of eco-drive in a graphic manner to show a relative state to the judgment threshold value displayed. The eco lamp 280 shows whether the state quantity of eco-drive is greater than or equal to the judgment threshold value to determine the vehicle is in the eco-drive state with the lighting ON/OFF.

The eco bar indicator 250 includes a bar indicator 51 of the state quantity of eco-drive representing the current eco-drive state of the vehicle, an eco-drive zone 252 (section OA in FIG. 19A), a non eco-drive zone 253 (section AB in FIG. 19), a regeneration zone 254 (section CO in FIG. 19A), and a non eco-drive zone 256 on the regeneration zone side (section CD in FIG. 19A), an engine startup threshold value (point G in FIG. 19A) and an HV eco zone 255. The eco-drive zone 252 shows a zone that makes it possible to determine that the vehicle is in the eco-drive state. The non eco-drive zone shows a zone that makes it possible to determine that the vehicle is not in the eco-drive state. The regeneration zone 254 shows a zone that makes it possible to determine that the vehicle is in the regeneration state.

A point "A" illustrated in FIG. 19A shows an upper limit value of the eco-drive zone 252 (judgment threshold value), and a boundary line between the eco-drive zone 252 and non eco-drive zone 253. When the state quantity of eco-drive is the judgment threshold value A, it shows that the state quantity of eco-drive is 100%. A point "O" is an original point, and shows the boundary line between the eco-drive zone 252 and the regeneration zone 254. When the state quantity of eco-drive is on the point "O", it shows that the state quantity of eco-drive is 0%. A position "C" shows the judgment threshold value of the regeneration zone 254. When the state quantity of eco-drive is on the point "C", it shows that the state quantity of eco-drive is −100%. The regeneration zone 254 from the point "O" to the point "C" is the zone for the hybrid vehicle, and shows that the driving state of the vehicle is the regeneration driving state due to the operation such as a regeneration break. The non eco-drive zone 256 on the regeneration zone 254 side shows that the break operation with a mechanical break in addition to the regeneration break is performed. The engine startup threshold value G is the threshold value that shows whether the engine of the hybrid vehicle is started up. If the state quantity of eco-drive is over the engine startup threshold value, the engine is started up by the powertrain ECU 210. If the state quantity of eco-drive is less than or equal to the engine startup threshold value, which means that the state quantity of drive is within the HV eco zone 255, the vehicle is driven by the driving power of the motor.

The eco bar indicator 250 shows how ideal the current state quantity of eco-drive is compared to the ideal eco-drive zone (the eco-drive zone 252) by using the ratio (a relative ratio) to the threshold value which represents 100%.

When the state quantity of eco-drive is within the eco-drive zone 252, the remaining amount of operation to the judgment threshold value for eco-drive can be shown. In FIG. 19, the section EA shows the remaining amount of operation.

When the state quantity of eco-drive is within the non eco-drive zone 253, the deviation amount of operation from the judgment threshold value for eco-drive can be shown. In FIG. 19B, the section AF shows the deviation value of operation.

The display of the eco lamp 280 shows whether the vehicle is in the eco-drive state or not with a lamp such as LED (Light Emitting Diode), and lights up when the vehicle is in the eco-drive state, and does not light up when the vehicle is not in the eco-drive state.

As illustrated in FIGS. 19A and 19B, it is possible to show whether the vehicle is currently in the eco-drive state or not, and show the operation guideline to maintain the eco-drive state or recover the eco-drive state by displaying the eco bar indicator 250 and the eco lamp 280 on the indicator panel 230.

However, if the lighting ON/OFF of the eco lamp 280 is determined by simply comparing the state quantity of eco-drive to the judgment threshold value, the chattering where the eco lamp 280 repeats ON and OFF continually occurs when the driver operates near the judgment threshold value.

Figure 20A:
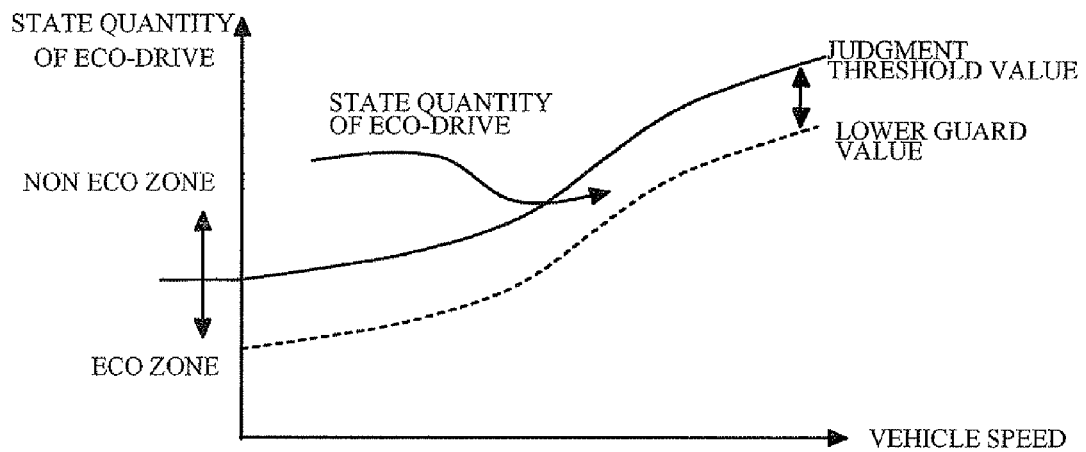
FIG. 20A is a diagram illustrating a relation between the eco-drive zone and the non eco-drive zone when a lower guard value is set below the judgment threshold value, and 20B is a diagram illustrating a relation between the eco-drive zone and the non eco-drive zone when the upper guard value is set above the judgment threshold value.
Figure 20B:
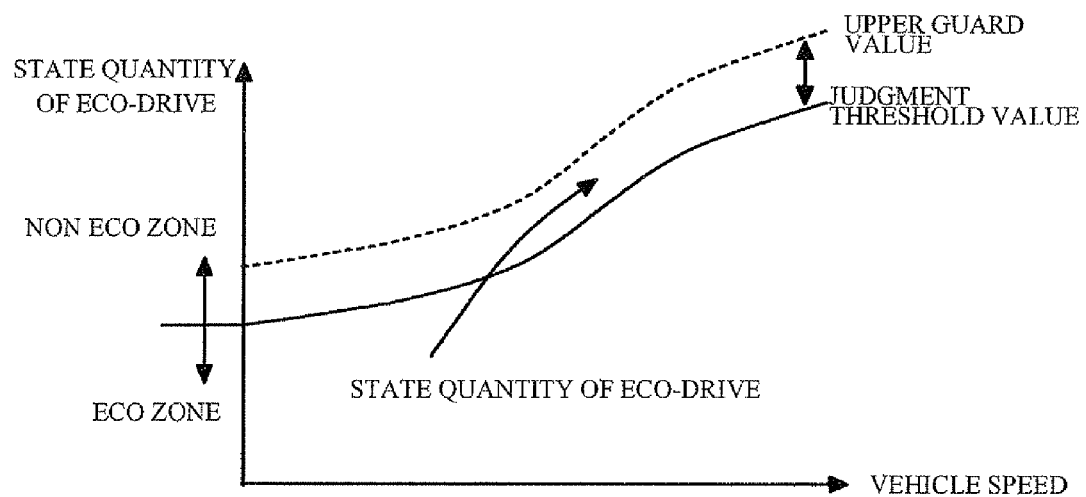

The chattering can be prevented by setting the guard value below the judgment threshold value as illustrated in FIG. 20A or setting the guard value above the judgment threshold value as illustrated in FIG. 20B, and by not switching the display of the eco lamp 280 when the state quantity of eco-drive is between the guard value and the judgment threshold value.

However, the inconsistency caused by setting the guard value can happen in the contents of the eco bar indicator 250 and the eco lamp 280.

A description will now be given of the case that the lower guard value is set below the judgment threshold value as an example. When the state quantity of eco-drive which was in the non eco-drive zone that is above the judgment threshold value falls down and comes into between the judgment threshold value and the lower guard value as illustrated in FIG. 20A, the eco bar indicator 250 displays the state quantity of eco-drive in the eco-drive zone 252. However, as the state quantity of eco-drive is between the judgment threshold value and the lower guard value, the display of the eco lamp 280 maintains the non eco-drive state, and does not light up.

In the same manner, the inconsistency of the display may happen when the upper guard value is set above the judgment threshold value. When the state quantity of eco-drive which was in the eco-drive zone that is below the judgment threshold value rises and comes into between the judgment threshold value and the upper guard value as illustrated in FIG. 20B, the eco bar indicator 250 displays the state quantity of eco-drive in the non eco-drive zone 253. However, as the state quantity of eco-drive is between the judgment threshold value and the upper guard value, the display of the eco lamp 280 maintains the eco-drive state, and keeps lighting up.

To solve this inconsistency of the display described above, in the present embodiment, if the state quantity of eco-drive comes into between the judgment threshold value and the lower guard value or between the judgment threshold value and the upper guard value, the counter starts counting, and the display of the eco lamp 280 is controlled to be changed when the counter count value becomes the given value. The lower guard value and the upper guard value correspond to the second judgment threshold value of the present invention.

The lower guard value and the upper guard value are not used at the same time, one of them is used. Under the condition that the lower guard value is set, if the state quantity of eco-drive rises from below the lower guard value, and comes into between the lower guard value and the judgment threshold value, as the inconsistency between the eco bar indicator 250 and the display of the eco lamp 280 does not occur, the counter does not start counting. The state quantity of eco-drive remains in the eco-drive zone 252, and the display of the eco lamp 280 shows the eco-drive state, and lights up.

In the same manner, under the condition that the upper guard value is set, if the state quantity of eco-drive falls down from the upper side which is above the upper guard value, and comes into between the upper guard value and the judgment threshold value, as the inconsistency between the eco bar indicator 250 and the display of the eco lamp 280 does not occur, the counter does not start counting. The state quantity of eco-drive remains in the non eco-drive zone 253, and the display of the eco lamp 280 is the non eco-drive state, and does not light up.

Figure 21:
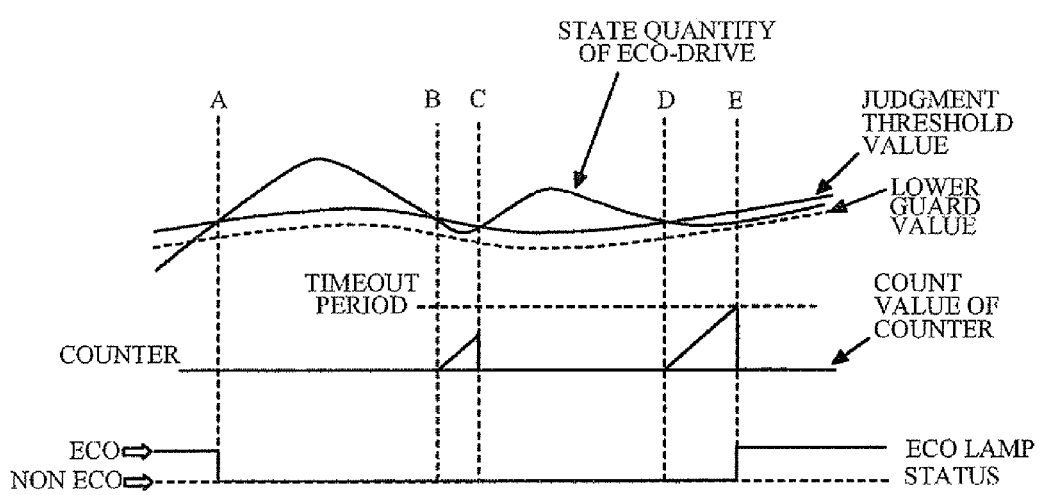
FIG. 21 is a diagram illustrating the change of the state quantity of eco-drive and the ON/OFF state of the eco lamp when the lower guard value is set.
Figure 22:
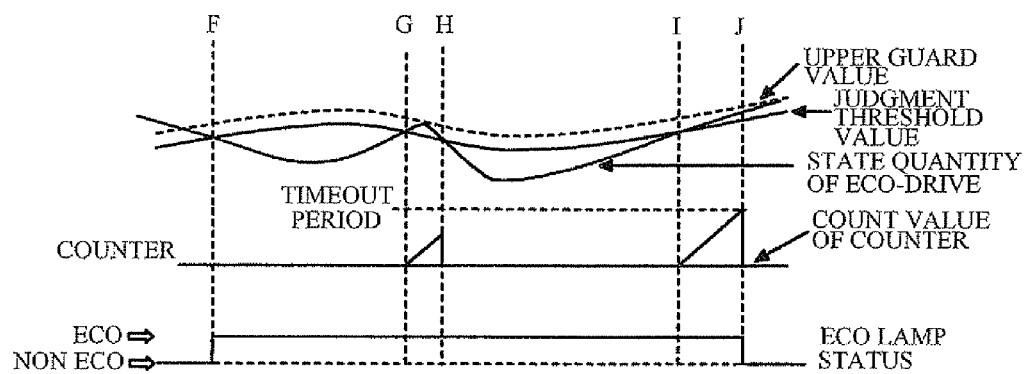
FIG. 22 is a diagram illustrating the change of the state quantity of eco-drive and the ON/OFF state of the eco lamp when the upper guard value is set.

Referring to FIGS. 21 and 22, a description will now be given of the fluctuation of the state quantity of eco-drive, and the display switch of the eco lamp 280 based on the fluctuation. Referring to FIG. 21, a description will be given of the case that the lower guard value is set below the judgment threshold value.

When the operation amount of the vehicle (e.g. accelerator opening) rises and the state quantity of eco-drive exceeds the judgment threshold value at the point A in FIG. 21, the eco judgment unit 262 determines that the driving state of the vehicle is the non eco-drive state. As the driving state moves to the non eco-drive state, the display of the eco lamp 280 is changed from lighting-on to lighting-off.

When the operation amount of the vehicle decreases and the state quantity of eco-drive falls below the judgment threshold value at the point B in FIG. 21, the eco judgment unit 262 makes the counter start counting. If the state quantity of eco-drive exceeds the judgment threshold value before the count value of the counter exceeds the timeout value (at the point C in FIG. 21), the judgment of the non eco-drive state is maintained. If the state quantity of eco-drive falls below the lower guard value before the count value exceeds the timeout value, the eco judgment unit 262 determines that the vehicle is in the eco-drive state, and turns the eco lamp 280 on.

If the count value of the counter exceeds the timeout value (at the point E in FIG. 21) while the state quantity of eco-drive falls below the judgment threshold value (at the point D in FIG. 21) and is between the judgment threshold value and the lower guard value, the eco judgment unit 262 determines that the vehicle is in the eco-drive state, and turns the eco lamp 280 on.

A description will now be give of the case that the upper guard value is set above the judgment threshold value with reference to FIG. 22.

If the operation amount of the vehicle falls down and the state quantity of eco-drive falls below the judgment threshold value at the point F in FIG. 22, the eco judgment unit 262 determines that the driving state of the vehicles is the eco-drive state. As the driving state moves to the eco-drive state, the eco lamp 280 is changed from lighting-off to lighting-on.

Then, if the operation amount of the vehicle rises, and the state quantity of eco-drive exceeds the judgment threshold value at the point G in FIG. 22, the eco judgment unit 262 makes the counter start counting. If the state quantity of eco-drive falls below the judgment threshold value (at the point H in FIG. 22) before the count value of the counter exceeds the timeout value, the judgment of the eco-drive state is maintained. If the state quantity of eco-drive exceeds the upper guard value before the count value exceeds the timeout value, the eco judgment unit 262 determines that the vehicle is in the non eco-drive state.

If the count value of the counter exceeds the timeout value (at the point 3 in FIG. 22) while the state quantity of eco-drive exceeds the judgment threshold value (at the point I in FIG. 22) and is between the judgment threshold value and the upper guard value, the eco judgment unit 262 determines that the vehicle is in the non eco-drive state.

Figure 23:
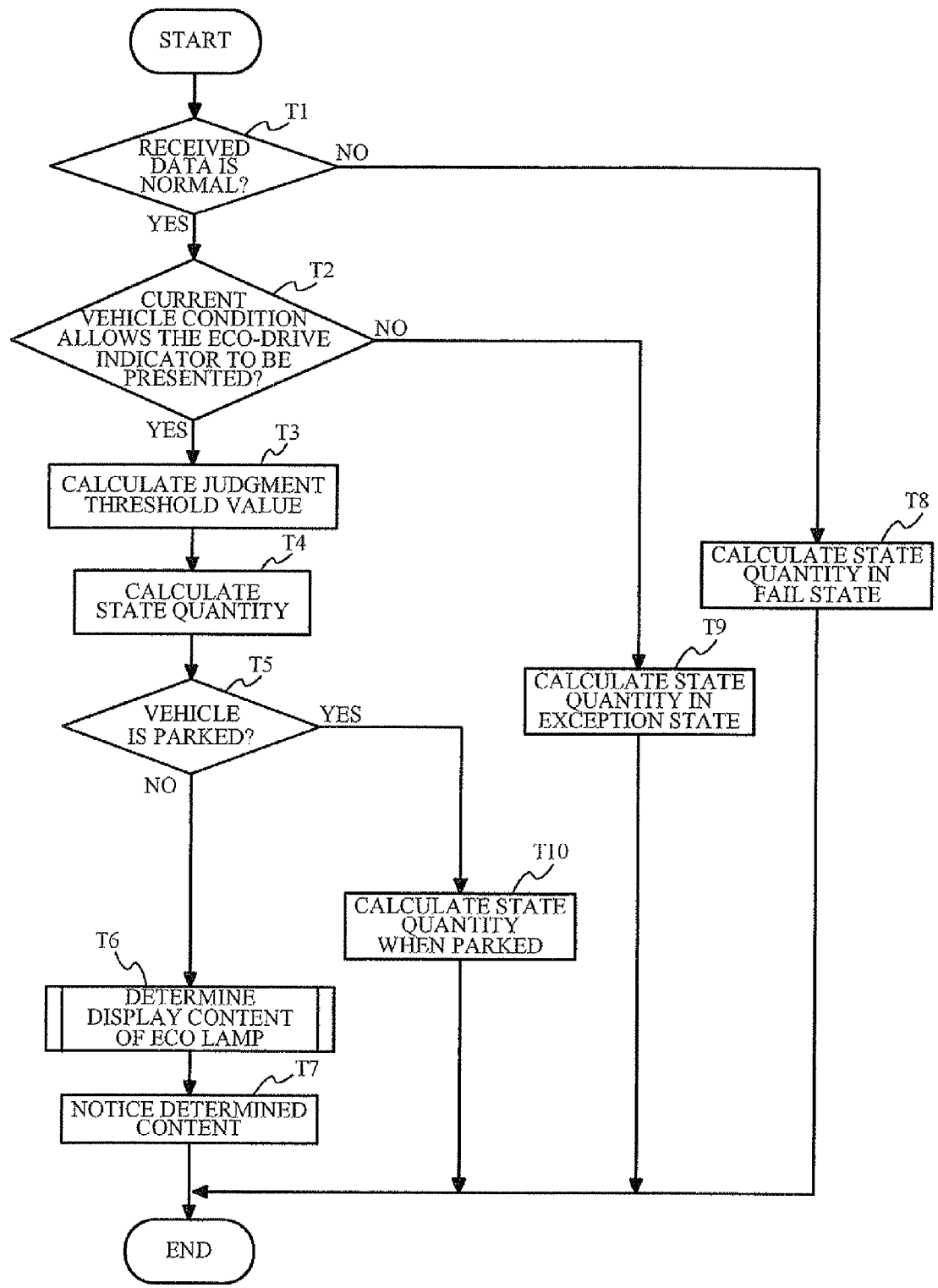
FIG. 23 is a flowchart illustrating a procedure of an eco judgment unit.

The processes of the eco judgment unit 262 to display the eco bar indicator 250 and the display of the eco lamp 280 on the indicator panel 230 is described with reference to a flowchart illustrated in FIG. 23.

When the eco judgment unit 262 receives the measured data from the group of sensors 202, it determines whether the received data are normal (step T1). The eco judgment unit 262 determines whether the group of sensor 202 operates normally by checking received data. For example, if identical data is continuously input over a predetermined time, it is determined that the abnormal fixing occurs in the group of sensors 202.

When the eco judgment unit 262 determines that the measured data is abnormal (step T1/NO), it calculates 0% as the state quantity of eco-drive in the fail state of the group of sensors (step T8).

When the eco judgment unit 262 determines that the measured data are normal (step T1/YES), it determines whether the vehicle state allows the eco-drive display (the eco bar indicator 250, and the display of the eco lamp 280) to be presented (step T2). When the shift lever is at the reverse position or parking position or a signal having a power switch ON is input, it determines that the eco-drive display cannot be presented.

When the eco judgment unit 262 determines that the eco-drive display is not allowed to be presented (step T2/NO), it calculates 0% as the state quantity of eco-drive in the exception state (step T9).

Figure 17:
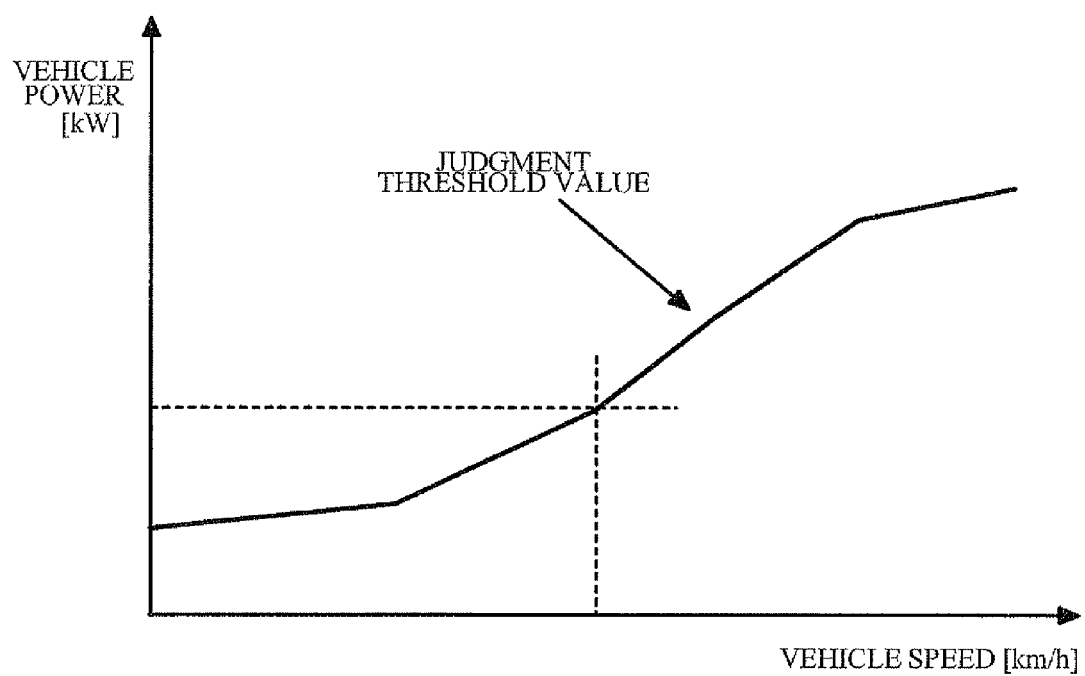
FIG. 17 is a diagram illustrating a map for calculating a judgment threshold value from a vehicle speed.

Then, the eco judgment unit 262 refers to the map illustrated in FIG. 17, and obtains the judgment threshold value for eco-drive (step T3). In the present embodiment, the judgment threshold value and the vehicle power are calculated based on the vehicle speed input from sensors. The eco judgment unit 262 stores the map illustrated in FIG. 17 in the memory, and obtains the judgment threshold value of the vehicle power based on the vehicle speed measured by the vehicle speed sensor included in the group of sensors 202. The map illustrated in FIG. 17 is calculated by the adjustment.

Then, the eco judgment unit 262 calculates the state quantity of eco-drive based on the judgment threshold value obtained in the step T3 and the current vehicle power calculated based on the measured data from the group of sensors 202 (step T4). The state quantity of eco-drive can be calculated with the formula (3) described above.

Then the eco judgment unit 262 determines whether the vehicle is parked (step T5). Whether the vehicle is parked or not is determined based on a vehicle speed input from the vehicle speed sensor included in the group of sensors 202. For example, when the vehicle speed falls below 2 km/h, it is determined that the vehicle is parked, and when the vehicle speed exceeds 4 km/h, it is determined that the vehicle is traveling. When a vehicle speed is between 2 km/h and 4 km/h, the determination of whether the vehicle is parked is not made, and is made to be ready until a vehicle speed changes.

When it is determined that the vehicle is parked (step T5/YES), 0% is calculated as the state quantity of eco-drive when the car is parked (step T10).

Then, the eco judgment unit 262 determines the display state of the eco lamp 280 based on the calculated state quantity of eco-drive. The detail of this process will be described later referring to flowcharts illustrated in FIGS. 24 and 25.

After the eco judgment unit 262 determines the display state of the eco lamp 280, it notices the information indicating the state quantity of eco-drive and the display state of the eco lamp 280 to the meter ECU 220. The meter ECU 220 displays the eco bar indicator 250 and the display of the eco lamp 280 based on the state quantity of eco-drive and the display state of the eco lamp noticed from the eco judgment unit 262.

Figure 24:
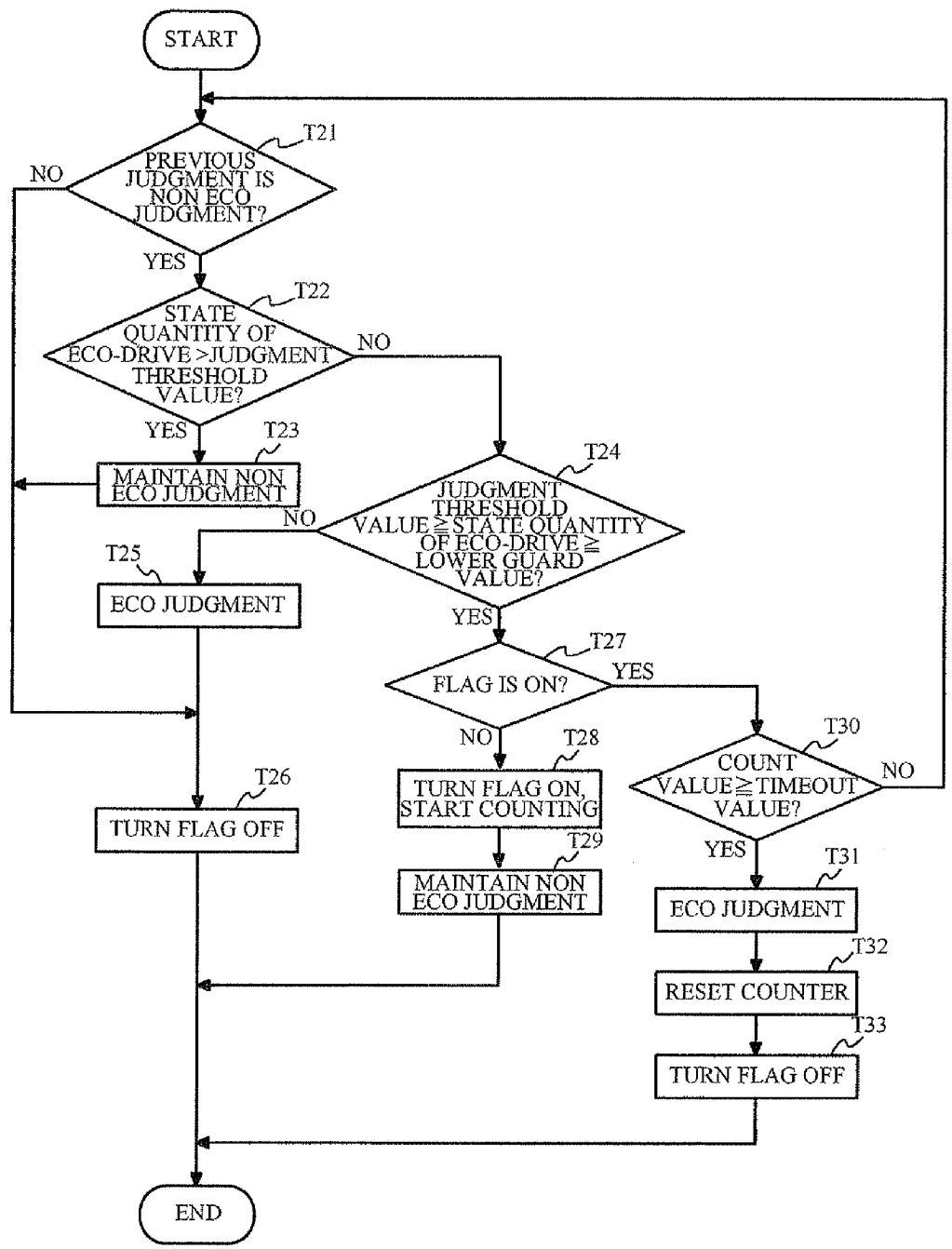
FIG. 24 is a flowchart illustrating a procedure for judging an eco-drive state or non eco-drive state based on the state quantity of eco-drive when the lower guard value is set.
Figure 25:
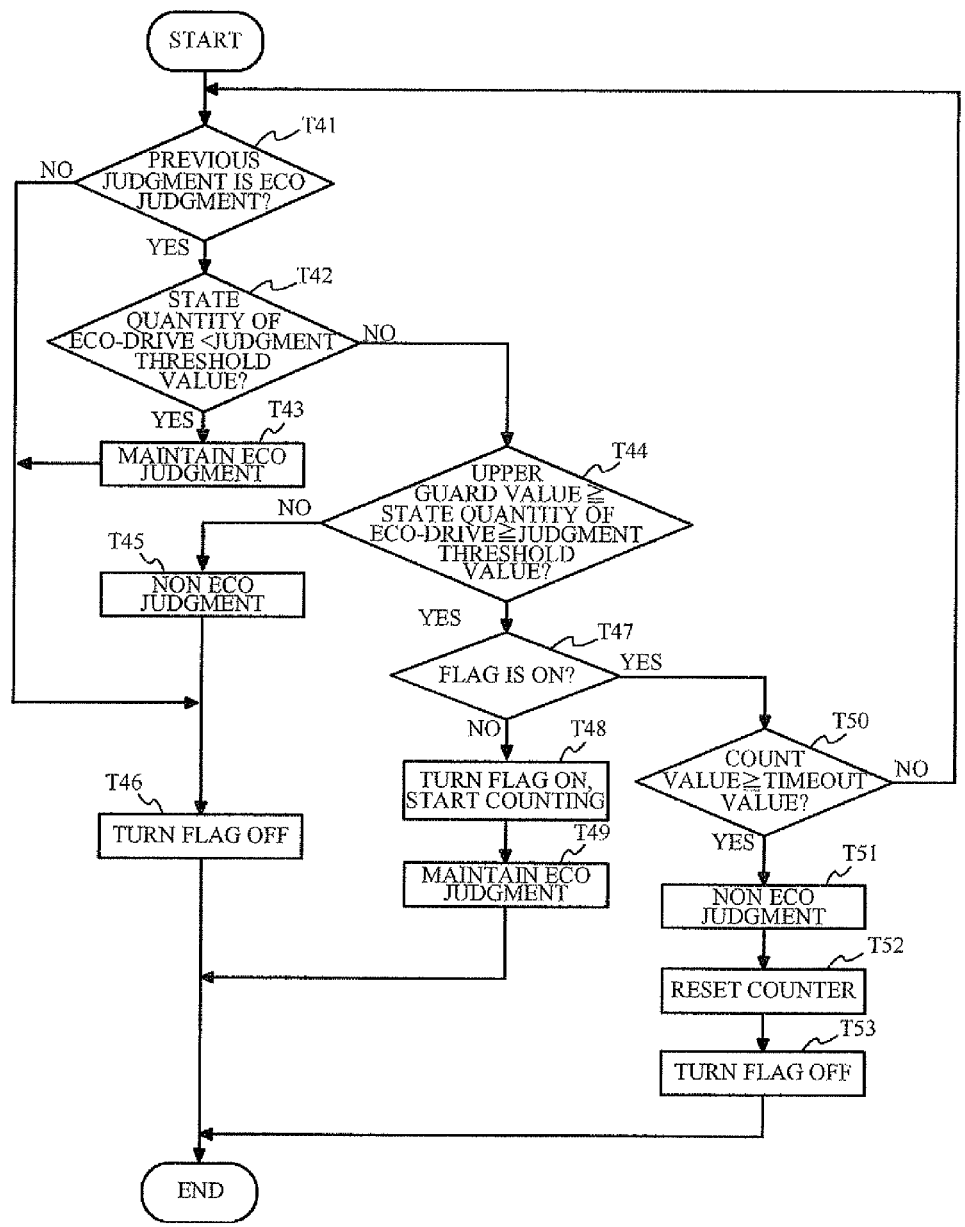
FIG. 25 is a flowchart illustrating a procedure for judging an eco-drive state or non eco-drive state based on the state quantity of eco-drive when the upper guard value is set.

The description will now be given of the detail of the step T6 with reference to flowcharts illustrated in FIGS. 24 and 25. Referring to FIG. 24, the process when the lower guard value is set below the judgment threshold value will be described.

The eco judgment unit 262 checks whether the judgment result based on the previous measured data is the coo judgment or the non eco judgment (step T21). When the judgment based on the previous measured data is the eco judgment (step T21/NO), the eco judgment unit 262 turns the flag off (step T26), and terminates this process. When the judgment based on the previous measured data is the non eco judgment (step T21/YES), the eco judgment unit 262 determines whether the state quantity of eco-drive is greater than the judgment threshold value (step T22). When the state quantity of eco-drive is greater than the judgment threshold value (step T22/YES), the eco judgment unit 262 maintains the non eco judgment (step T23). When the state quantity of eco-drive is less than or equal to the judgment threshold value (step T22/NO), the eco judgment unit 262 determines whether the state quantity of eco-drive is greater than or equal to the lower guard value and less than or equal to the judgment threshold value (step T24). When the state quantity of eco-drive is not greater than or equal to the lower guard value, nor less than or equal to the judgment threshold value (step T24/NO), which means that the state quantity of eco-drive is less than the lower guard value, the eco judgment unit 262 makes the eco judgment (step T25), turns the flag OFF, and terminates this process.

When the state quantity of eco-drive is greater than or equal to the lower guard value, and less than or equal to the judgment threshold value (step T24/YES), the eco judgment unit 262 determines whether the flag is set to ON (step T27). This flag is turned ON when the state quantity of eco-drive comes into between the judgment threshold value and the lower guard value from the non eco-drive zone.

When the flag is not ON (step T27/NO), the eco judgment unit 262 turns the flag ON, makes the counter start counting (step T28/YES), and determines that the non eco-drive state continues(step T29).

When the flag is ON (step T27/YES), the eco judgment unit 262 determines whether the count value of the counter is greater than or equal to the time out value (step T30). When the count value of the counter is less than the timeout value (step T30/NO), the eco judgment unit 262 goes back to the step T21 and executes the process for next measured data. When the count value of the counter is greater than or equal to the timeout value (step T30/YES), the eco judgment unit 262 determines that the state quantity of eco-drive is between the upper or lower guard value and the judgment threshold value over the predetermined time, makes the eco judgment (step T31), resets the counter (step T32), and turns the flag OFF (step T33).

A description will now be given of the process of the eco judgment unit 262 when the upper guard value is set above the judgment threshold value with reference to a flowchart illustrated in FIG. 25.

The eco judgment unit 262 checks whether the result of the eco judgment based on the previous measured data is the eco judgment or non eco judgment (step T41). When the judgment based on the previous measured data is the non eco judgment (step T41/NO), the eco judgment unit 262 turns the flag OFF (step T46), and terminates this process. When the judgment based on the previous measured data is the eco judgment (step T41/YES), the eco judgment unit 262 determines whether the state quantity of eco-drive is less than the judgment threshold value (step T42). When the state quantity of eco-drive is less than the judgment threshold value (step T42/YES), the eco judgment unit 262 maintains the eco judgment (step T43). When the state quantity of eco-drive is greater than or equal to the judgment threshold value (step T42/NO), the eco judgment unit 262 determines whether the state quantity of eco-drive is less than or equal to the upper guard value, and greater than or equal to the judgment threshold value (step T44). When the state quantity of eco-drive is not less than or equal to the upper guard value, nor greater than or equal to the judgment threshold value (step T44/NO), which means that the state quantity of eco-drive is greater than the upper guard value, the eco judgment unit 262 makes the non eco judgment (step T45), turns the flag OFF (step T46), and terminates this process.

When the state quantity of eco-drive is less than or equal to the upper guard value, and is greater than or equal to the judgment threshold value (step T44/YES), the eco judgment unit 262 determines whether the flag is set to ON (step T47). This flag is turned ON when the state quantity of eco-drive comes into between the judgment threshold value and the lower guard value from the eco-drive zone.

When the flag is not ON (step T47/NO), the eco judgment unit 262 turns the flag ON, makes the counter start counting (step T48), and makes the eco judgment that the eco-drive state continues (step T49).

When the flag is ON (step T47/YES), the eco judgment unit 262 determines whether the count value of the counter is greater than or equal to the timeout value (step T50). When the count value of the counter is less than the timeout value (step T50/NO), the eco judgment unit 262 goes back to the step T41, and executes the process to the next measured data. When the count value of the counter is greater than or equal to the timeout value (step T50/YES), the eco judgment unit 262 determines that the state quantity of eco-drive is between the upper limit or lower limit guard and the judgment threshold value over the predetermined time (step T51), resets the counter (step T52), turns the flag OFF (step T53), and terminates the process.

According to the present embodiment, the inconsistency between the eco bar indicator 250 and the display of the eco lamp 280 showing whether the vehicle is in the eco-drive state or non eco-drive state does not occur because the display of the eco lamp 280 is corrected to adjust to the eco bar indicator 250 when there is inconsistency between these displays. Therefore, if the driver drives according to these displays, the fuel economy will be increased.

[Fourth Embodiment]

As the composition of the present embodiment is same as the third embodiment described above, the detail description will be omitted. In the present embodiment, the timeout period of the counter is changed based on a vehicle speed or the acceleration operation quantity. For example, if the fluctuation of the vehicle speed or acceleration operation quantity is large, the timeout period is set to be short, and the display of the eco lamp 280 is controlled so as to follow the change of the state quantity of eco-drive of the eco bar indicator 250 quickly.

In addition to this, it is possible to learn the operation level of the driver, and set the timeout period of the counter on the basis of the learned operation level.

For example, if the period that the vehicle is in the eco-drive state is more than the standard period during a trip (from on to off of the ignition key), which means that the driver's operation level is high, the timeout period will be set to be long. On the contrary, if the period that the vehicle is in the eco-drive state is less than the standard period during a trip, which means that the driver's operation level is low, the timeout period will be set to be short.

In addition to changing the count value of the counter, a setting of the lower guard value or upper guard value may be changed on the basis of the period that the state quantity of eco-drive is between the judgment threshold value described above and the lower guard value or the upper guard value. More specifically, to the driver of which the period that the state quantity of eco-drive is between the judgment threshold value and the lower guard value is long, the lower guard value is made large and the range between the lower guard value and the judgment threshold value is made small. The upper guard value is made in the same manner. As this control is performed, it is possible to shorten the period that the inconsistency between the display of the eco lamp 280 and the eco bar indicator 250 occurs.

[Fifth Embodiment]

In the present embodiment, the process executed by the eco judgment unit 13 of the powertrain ECU 10 illustrated in FIG. 1 is executed by the eco judgment unit 262 of the HV-ECU 260 illustrated in FIG. 16. The eco judgment unit 262 of the HV-ECU 260 has the composition illustrated in FIG. 3.

The outline of the behavior of other ECUs such as the HV-ECU 260, the meter ECU 220, and the motor/generator ECU 270 will be omitted because the description has been already given in the fourth embodiment.

FIG. 26 illustrates an exemplary notice contents of the eco state signal output to the notice control unit 221 of the meter ECU 220 from the notice content judgment unit 95 (see FIG. 3) of the eco judgment unit 262 provided to the HV-ECU 260.

The eco state signal noticed from the notice content judgment unit 95 to the notice control unit 221 also includes an advice status (1 byte), a signal indicating the state quantity of the eco zone display (2 bytes), and a signal indicating the state quantity of the HV eco zone display (1 byte).

The vehicle state judged by the notice content judgment unit 95 has six statuses: "fail", "exception" (which is the state in that the information for assisting eco-drive is not displayed), "parked", "non eco", "eco", and "hybrid eco (HV eco)". The notice content judgment unit 95 notices in which state of the six states the vehicle is to the notice control unit 221 with the advice status signal which is 1-byte signal.

The notice control unit 221 turns off the eco lamp 280 when the status of the advice status signal is "fail", "exception", "parked" or "non eco". The notice control unit 221 turns on the eco lamp 280 when the status of the advice status signal is "eco" or "HV eco".

When it is determined that the failure occurs in the vehicle, the notice content judgment unit 95 outputs a signal of which the state quantity of eco zone display and the state quantity of HV eco zone are set to predetermined values representing "fail" to the notice control unit 221.

When the vehicle is in the state that it is not necessary to display the information for assisting eco-drive, the notice content judgment unit 95 outputs a signal of which the state quantity of eco zone display and the state quantity of HV eco zone display are set to predetermined values representing "exception" to the notice control unit 221.

When it is determined that the vehicle is parked, the notice content judgment unit 95 outputs the signal of which the state quantity of eco zone display is set to the predetermined value representing "parked" and of which the state quantity of HV eco zone display is set to between 0% and 100%, to the notice control unit 221.

When the notice content judgment unit 95 determines that the driving state of the vehicle is the non eco-drive state, it outputs a signal of which the state of eco zone display is set to greater than 100% and less than or equal to 120%, and a signal of which the state quantity of HV eco zone display is set to between 0% and 100% to the notice control unit 221.

When the notice content judgment unit 95 determines that the driving state of the vehicle is the eco-drive state, it outputs a signal of which the state quantity of eco zone display is set to greater than or equal to 0% and less than or equal to 100%, and a signal of which the state quantity of HV eco zone display is set to between 0% and 100% to the notice control unit 221.

In the present embodiment, in the same manner as the first embodiment described above, it is possible to generate the beneficial information for assisting eco-drive in the eco judgment unit 262, and to transmit it to the meter ECU 220 functioning as a display control apparatus. As the ratio to the judgment threshold value of the accelerator opening indicating the driving state of the vehicle is shown, it is possible to show how much the driving operation should be improved for eco-drive, or how far the accelerator pedal can be pressed to keep the vehicle in the eco-drive state.

Although detail descriptions are given of preferred embodiments of the present invention, the present invention is not limited to the specifically described embodiments and variations, but other embodiments and variations may be made without departing from the scope of the present invention.

For example, in the first and second embodiments, the eco judgment units 13 and 113 are provided to the powertrain ECUs 10 and 110 of the vehicle equipped with only an engine respectively, but they can be provided to the hybrid vehicle equipped with the engine and the motor as illustrated in FIG. 16.

When the eco judgment units 13 and 113 in the first and second embodiments are provided to the HV-ECU 260 illustrated in FIG. 16, the eco judgment units 13 and 113 receive the HV status signal output from the HV control unit 261 and sensor signals output from the group of sensors 202, and calculate the state quantity of eco-drive indicating whether the vehicle is in the state of eco-drive. The calculation process of the eco-drive state in the HV vehicle is already described in the third embodiment, and is omitted.

In the same manner, in the third and fourth embodiments, the description is given by using the composition where the eco judgment unit 262 is provided to the HV-ECU 260, but the eco judgment unit 262 can be provided in the powertrain ECU 10 illustrated in FIG. 1 when it is provided to the vehicle equipped with only an engine.

The eco judgment units 13 and 113 in the powertrain ECU 10 obtain the control information from the engine control unit 11 and the transmission control unit 12 in the powertrain ECU 10, obtain sensor signals from the group of sensors 2, and calculate the state quantity of eco-drive for determining whether the vehicle is in the eco-drive state. The eco judgment units 13 and 113 determines whether the driving state of the vehicle is the eco-drive state or the non eco-drive state on the basis of the calculated state quantity of eco-drive.

Figure 27:
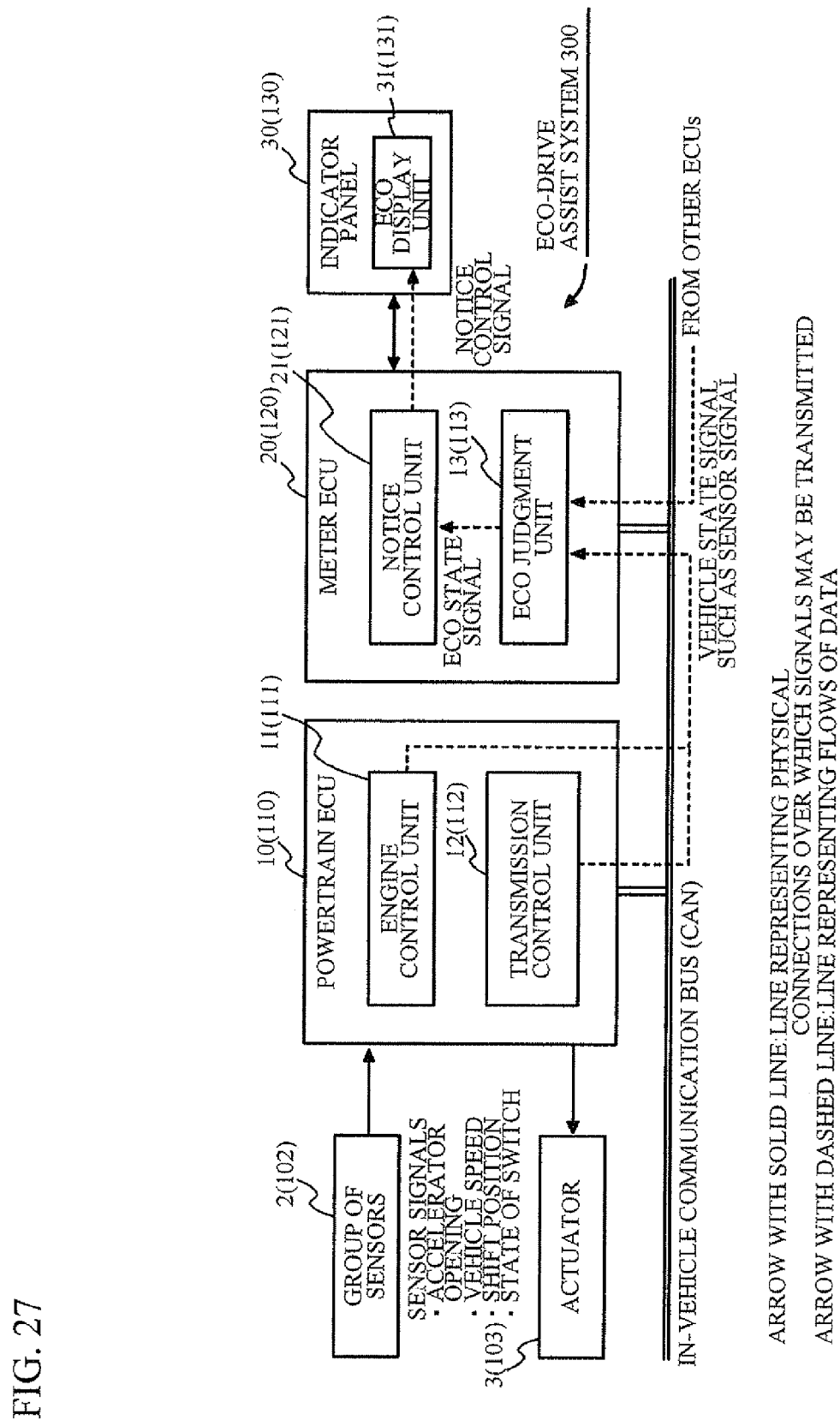
FIG. 27 is a diagram illustrating a composition of the eco-drive assist system where an eco judgment unit is provided to a meter ECU.

FIG. 27 illustrates the composition where the eco judgment units 13 and 113 of the first and second embodiments are provided to the meter ECU 20(120) in the eco-drive assist system 300 of the vehicle equipped with only an engine. In this case, the meter ECU 20(120) obtains the vehicle information such as a vehicle speed from the powertrain ECU 10(110) with CAN communication, and calculates the state quantity of eco-drive based on the obtained information. The display state of the eco bar indicator 50(150) and eco lamp 80(180) is determined based on the calculated state quantity of eco-drive, and is displayed in the eco display unit 31(131). It is not illustrated but the eco judgment unit 263 of the third and fourth embodiments can be provided to the meter ECU of the hybrid vehicle.

The function of the eco judgment units 13, 113, and 263 described above can be installed to a navi-ECU that controls a navigation apparatus, and eco bar indicators 50, 150, and 250 can be displayed on the display of the navigation apparatus.

Figure 28A:
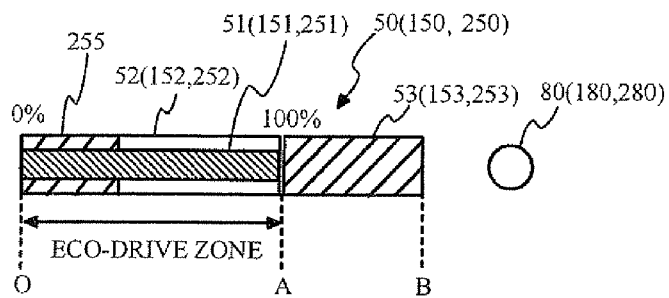
FIG. 28 is a diagram illustrating another example of the eco bar indicator, 28A illustrates an example that displays a non eco-drive zone with the lightening on/off of an LED, 28B illustrates an example that displays a non eco-drive zone on the regeneration zone side with the lightening on/off of an LED, and 28C is a diagram illustrating an example that displays an eco bar with a circular indicator.
Figure 28B:
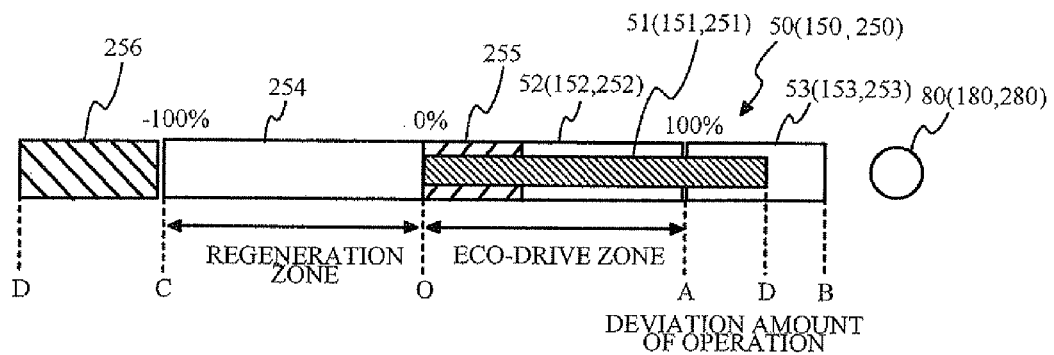

The non eco-drive zone 53, 153, or 253 can be displayed by controlling the lighting-on/off of the LED and the like instead of the eco bar indicator (see FIG. 28A), or the non eco-drive zone 256 on the regeneration zone side can be displayed by controlling the lighting-on/off of the LED (see FIG. 28B).

When the state quantity of eco-drive exceeds 100%, the non eco-drive zone 53, 153, or 253 is turned ON (lighting-on). In the same manner, when the state quantity of eco-drive falls under −100%, the non eco-drive zone 256 on the regeneration zone side is turned ON (lighting-on).

The regeneration zone 254 can be displayed with the eco bar indicator, or by controlling the lighting-on/off of the LED.

In the eco display unit 231, the zone where the state quantity of eco-drive is greater than or equal to 0% can be divided into the HV eco zone 255 and other zones, or it is possible to have the composition where the HV eco zone 255 is not provided.

Figure 28C:
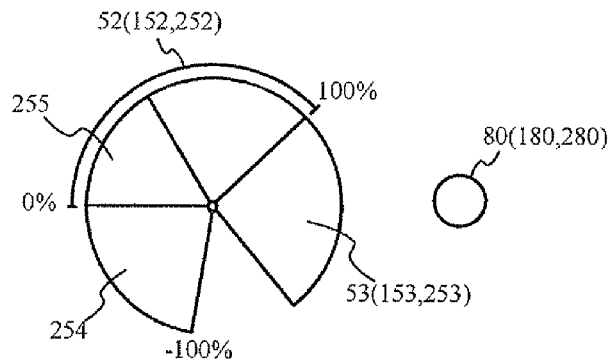

In the eco display unit 31(131, or 231), the display using the circular indicator such as the speed meter illustrated in FIG. 28C can be used instead of the eco bar indicator.

In the embodiments described above, the state quantity of eco-drive of the vehicle is calculated on the basis of a vehicle speed and the like, and is displayed in real time. However, it is possible to display the moment-to-moment change of the state quantity of eco-drive by recording the vehicle speed and the state quantity of eco-drive calculated by the eco judgment unit 13(153, or 262) to the recording medium and the like, and reading the contents recorded in the recording medium to the computer apparatus after getting out of the vehicle.

In the above embodiments, the state quantity of eco-drive is calculated by calculating the vehicle power, and comparing the vehicle power to the judgment threshold value, but the state quantity of eco-drive can be calculated based on the accelerator opening other than the vehicle power.

The invention claimed is:

1. An eco-drive assist apparatus that shows a degree of eco of a driving operation of a vehicle, the eco-drive assist apparatus comprising;
    an eco-drive assist information generating apparatus that calculates a judgment threshold value and a state quantity of eco drive,
    the state quantity of eco drive indicating a ratio to the judgment threshold value, and
    the judgment threshold value fluctuating based on the driving state of the vehicle; and
    a display device that is comprised of a different body with the eco-drive assist information apparatus, and executes a display based on information transmitted from the eco-drive assist information generating apparatus, the display device displaying a relative state to the judgment threshold value, wherein
    the eco-drive assist information generating apparatus is a control apparatus that controls an engine mounted to the vehicle, calculates the state quantity of eco-drive based on a control state signal of the engine acquired during the engine control, transmits the state quantity of eco-drive to the display device, determines whether a vehicle state is at least one of a failure state, an exception state in which information for assisting eco-drive is not necessary to be displayed, and a parked state, and transmits the determined vehicle state to the display device, and
    the display device does not execute the display based on information transmitted from the eco-drive assist information generating apparatus when the vehicle state transmitted from the eco-drive assist information generating apparatus is at least one of the failure state, the exception state, and the parked state.

2. The eco-drive assist apparatus according to claim 1, wherein the display device fixedly displays a first figure indicating the judgment threshold value regardless of a value of the judgment threshold value, and displays a second figure in a predetermined place relative to the first figure according to a ratio that the state quantity of eco-drive indicates based on the state quantity of eco-drive transmitted from the eco-drive assist information generating apparatus.

3. The eco-drive assist apparatus according to claim 1, wherein the eco-drive assist information generating apparatus transmits information to the display device in a common data format regardless of a display design of the display device.

4. The eco-drive assist apparatus according to claim 1, wherein the eco-drive assist information generating apparatus does not transmit the judgment threshold value to the display device.

5. An eco-drive assist apparatus that shows a degree of eco of a driving operation of a hybrid vehicle, the eco-drive assist apparatus comprising;
an eco-drive assist information generating apparatus that calculates a judgment threshold value and a state quantity of eco-drive,
the state quantity of eco-drive indicating a ratio to the judgment threshold value, and
the judgment threshold value fluctuating based on the driving state of the hybrid vehicle; and
a display device that is comprised of a different body with the eco-drive assist information apparatus, and executes a display based on information transmitted from the eco-drive assist information generating apparatus, the display device displaying a relative state to the judgment threshold value, wherein
the eco-drive assist information generating apparatus is a control apparatus that controls a hybrid system in the hybrid vehicle, calculates the state quantity of eco-drive based on a hybrid state signal acquired during the control of the hybrid system, transmits the state quantity of eco-drive to the display device, determines whether a vehicle state is at least one of a failure state, an exception state in which information for assisting eco-drive is not necessary to be displayed, and a parked state, and transmits the determined vehicle state to the display device, and
the display device does not execute the display based on information transmitted from the eco-drive assist information generating apparatus when the vehicle state transmitted from the eco-drive assist information generating apparatus is at least one of the failure state, the exception state, and the parked state.

6. An eco-drive state display apparatus that displays an eco-drive state in real time, the eco-drive state display apparatus comprising:
an eco judgment unit that judges whether a current driving state of a vehicle is an eco-drive state or non eco-drive state based on a fluctuating boundary value that is calculated based on a state quantity representing a current driving state of the vehicle and distinguishes whether a current driving state of the vehicle is an eco-drive state or non eco-drive state;
a first display unit that displays an eco-drive state by displaying a figure corresponding to the boundary value and a figure corresponding to a current value representing a current driving state of the vehicle to the boundary value; and
a second display unit that displays whether the current driving state of the vehicle judged by the eco judgment unit is an eco-drive state or non eco-drive state by turning on/off a lamp, wherein
the first display unit fixedly-displays a figure corresponding to a boundary value in a predetermined place in a display area, and changes a display form of a figure corresponding to the current value according to a relative relation of the current value to the boundary value,
the eco judgment unit uses, when judging a driving state of the vehicle to be displayed by the second display unit. different values for the boundary value used to judge a current driving state of the vehicle between when the state quantity transitions from the eco-drive state to the non eco-drive state and when the state quantity transitions from the non eco-drive state to the eco-drive state, and
the first display unit fixedly-displays the figure corresponding to the boundary value at a same position regardless of whether the driving state judged by the eco judgment unit is the eco-drive state or the non eco-drive state.

7. The eco-drive state display apparatus according to claim 6, wherein the eco judgment unit uses different values to the threshold value for the judgment between a case that a driving state moves from the eco-drive state to the non eco-drive state and a case that a driving state moves from the non eco-drive state to the eco-drive state when judging the driving state of the vehicle displayed by the second display unit, and
the first display unit fixedly displays the boundary value at the same location both when the driving state judged by the eco judgment unit is the eco-drive state and when the driving state judged by the eco judgment unit is the non eco-drive state.

8. The eco-drive state display apparatus according to claim 6, wherein the first display unit displays a figure representing a corrected state quantity by keeping the state quantity at the boundary value for a given time after the state quantity below the boundary value exceeds the boundary value, and a figure representing a corrected state value by keeping the state quantity at the boundary value for a given time after the state quantity above the boundary value falls below the boundary value,
the eco judgment unit judges whether the current driving state of the vehicle is an eco-drive state or non eco-drive state based on the corrected state quantity and the boundary value.

9. The eco-drive state display apparatus according to claim 6, wherein the first display unit continuously displays a first display area that displays a state quantity when the vehicle stops an engine and runs by the driving force of a motor, and a second display area that displays a state quantity when the vehicle runs by the driving force of the engine, or the engine and the motor, and displays a threshold value representing the state quantity when the engine starts at the boundary between the first display area and the second display area.

10. An eco-drive assist apparatus comprising:
a first display control unit that displays one of ON and OFF as one of an eco-drive state and non-eco drive state respectively based on whether a quantity of the eco-drive state representing a degree of eco of a driving state of a vehicle is greater than a first judgment threshold value used to determine whether the vehicle is in an eco-drive state or not; and;
a second display control unit that displays the quantity of eco-drive state in a graphical manner so that a relative state to the first judgment threshold value displayed can be shown, wherein
the first display control unit makes one of determinations that are changing a display state from the eco-drive state to the non-eco-drive state and changing the display state from the non-eco-drive-state to the eco-drive state, based on a second judgment threshold value which is offset by a predetermined amount from the first judgment threshold value, so as to use a different judgment threshold value between when the display state is changed from the eco-drive to the non-eco-drive state and when the display state is changed from the non-eco-drive state to the eco-drive state, the second display control unit displays a figure corresponding to the first judgment threshold at the same location when the display state of the first display control unit is the eco-drive state and when the display state of the first display control unit is the non-eco-drive state, and the eco-drive assist apparatus further comprising:

a display state adjusting unit that changes one of the display state of the first display control unit and a state of eco/non eco controlled by the second display control unit, so that display the state of the first display control unit becomes the same as the state of eco/non eco controlled by the second display control unit when the display state of the first display control unit does not change because the quantity of eco-drive state exceeds the first judgment threshold value but does not exceed the second judgment threshold value continues over a predetermined time.

11. An eco-drive assist apparatus comprising:

a first display control unit that displays one of ON and OFF as one of an eco-drive state and non-eco-drive state respectively based on whether a quantity of the eco-drive state representing a degree of eco of a driving state of a vehicle is greater than a first judgment threshold value used to determine whether the vehicle is in an eco-drive state; and a second display control unit that displays the state quantity of eco-drive in a graphical manner so that a relative state to the first judgment threshold value displayed can be shown, wherein the first display control unit makes one of determinations that are changing a display state from the eco-drive state to the non-eco-drive state and changing the display state from, non-eco-drive-state to the eco-drive state, based on a second judgment threshold value which is offset by a predetermined amount from the first judgment threshold value, so as to use a different judgment threshold value between when the display state is changed from the eco-drive to the non-eco-drive state and when the display state is changed from the non-eco-drive state to the eco-drive state, the second display control unit displays a figure corresponding to the first judgment threshold value at the same location both when the display state of the first display control unit is the eco-drive state and when the display state of the first display control unit is the non-eco-drive state and the eco-drive assist apparatus further comprising:

a display state adjusting unit that changes the display state of the first display control unit from the eco-drive state to the non-eco-drives state or from the non-eco-drive state to the eco-drive state when a the display state the first display control unit does not change because the quantity of eco-drive state exceeds the first judgment threshold value but does not exceed the second judgment threshold value continues over a predetermined time.

12. The eco-drive assist apparatus according to claim 11, wherein the display state adjusting unit changes display state of the first display control unit when a state that the quantity of eco-drive state is greater than or equal to the second judgment threshold value and less than or equal to the first judgment threshold value after exceeding the first judgment threshold value continues over a predetermined time under the condition that the second judgment threshold value is set below the first judgment threshold value.

13. The eco-drive assist apparatus according to claim 11, wherein the display state adjusting unit changes the display state of the first display control unit when a state that the quantity of eco-drive state is greater than or equal to the first judgment threshold value and less than or equal to the second judgment threshold value after falling below the first judgment threshold value continues over a predetermined time under the condition that the second judgment threshold value is set above the first judgment threshold value.

\* \* \* \* \*